US012681466B2

(12) United States Patent
Lu

(10) Patent No.: US 12,681,466 B2
(45) Date of Patent: Jul. 14, 2026

(54) APPARATUSES, COMPUTER-IMPLEMENTED METHODS, AND COMPUTER PROGRAM PRODUCTS FOR IMPROVED MULTI-MODAL OPTIMIZATION FOR PARTICULAR CONTROL SCHEMES

(71) Applicant: Honeywell International Inc., Charlotte, NC (US)

(72) Inventor: Joseph Z. Lu, Glendale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 704 days.

(21) Appl. No.: 18/159,524

(22) Filed: Jan. 25, 2023

(65) Prior Publication Data

US 2024/0248461 A1     Jul. 25, 2024

(51) Int. Cl.
*G05B 19/418* (2006.01)

(52) U.S. Cl.
CPC .................. *G05B 19/41865* (2013.01); *G05B 2219/32291* (2013.01)

(58) Field of Classification Search
CPC .... G05B 19/41865; G05B 2219/32291; G05B 23/0294
See application file for complete search history.

(56) References Cited

U.S. PATENT DOCUMENTS

| | | | | |
|---|---|---|---|---|
| 10,108,162 B2 * | 10/2018 | Mizutani | .......... | H01L 21/67276 |
| 10,649,449 B2 * | 5/2020 | Bell | ..................... | G05B 23/024 |
| 10,816,965 B2 * | 10/2020 | Yamamoto | ............ | G06Q 10/08 |
| 2016/0283254 A1 * | 9/2016 | Hill | ..................... | G06F 9/44552 |

* cited by examiner

*Primary Examiner* — Alvin H Tan
(74) *Attorney, Agent, or Firm* — ALSTON & BIRD LLP

(57) ABSTRACT

Embodiments generate improved optimizations of processing unit(s) associated with a particular dynamic control scheme (e.g., an MPC architecture). Embodiments perform the improved optimizations based on default assumptions associated with the scheme, for example status operation of a particular mode. Some embodiments generate default operating condition data associated with a particular timestamp interval, the default operating condition data at a first value representing a default assumption based on a first operational mode, identify first operating condition data associated with the first operational mode, representing the first value at particular subinterval(s) of the particular timestamp interval, generating intermediary operating condition data by removing the first operating condition data from the default operating condition data, generating adjusted operating condition data by including second operating condition data associated with a second subinterval of the subinterval of the particular timestamp interval, and optimizing based at least in part on the adjusted operating condition data.

18 Claims, 11 Drawing Sheets

$$\Delta CV_{CR} = A_2 \cdot \delta u_2 - A_1 \cdot \delta u_1 = (R_2 - R_1) \cdot \delta s = R_d \cdot \delta s$$

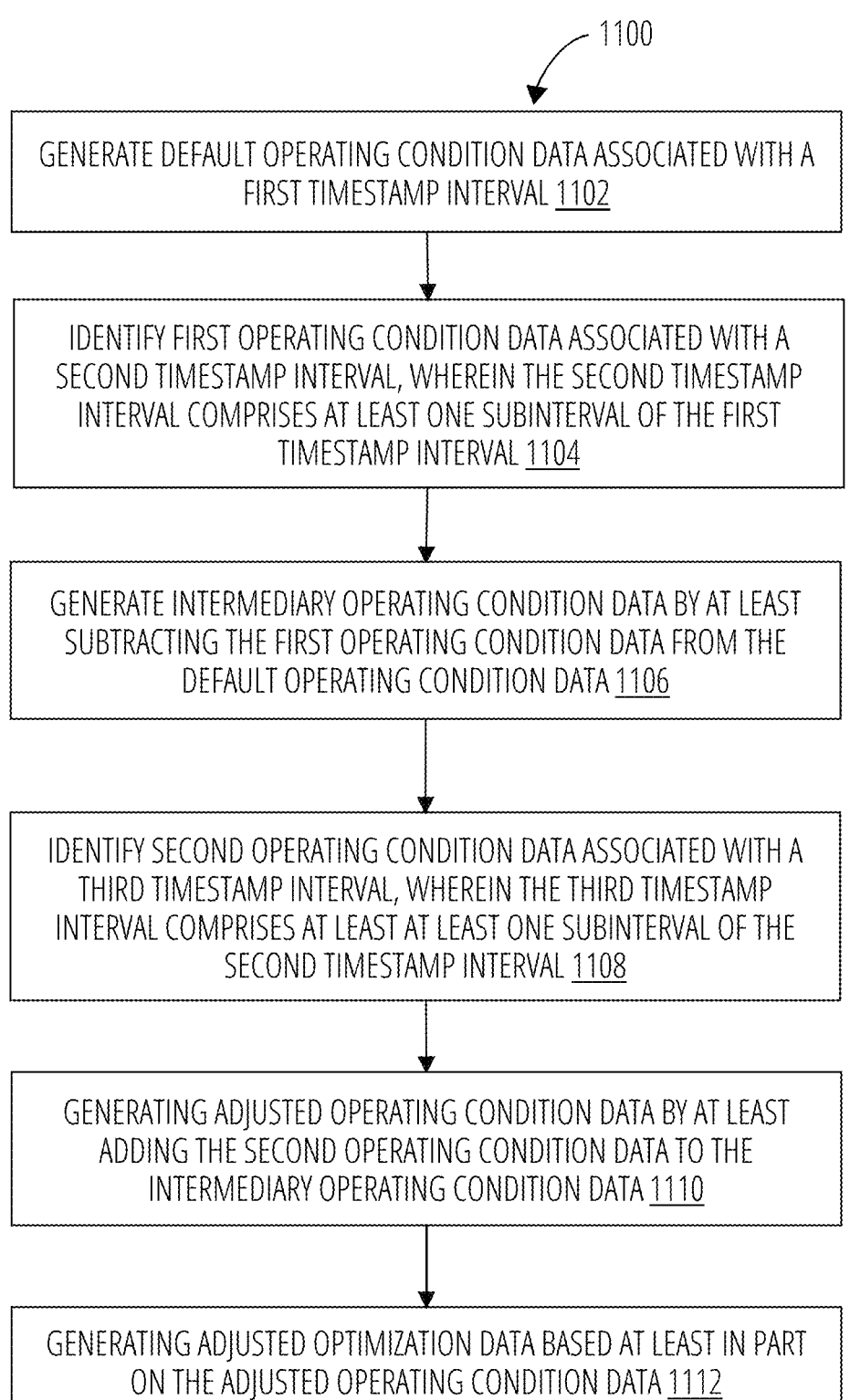

1100

GENERATE DEFAULT OPERATING CONDITION DATA ASSOCIATED WITH A FIRST TIMESTAMP INTERVAL 1102

IDENTIFY FIRST OPERATING CONDITION DATA ASSOCIATED WITH A SECOND TIMESTAMP INTERVAL, WHEREIN THE SECOND TIMESTAMP INTERVAL COMPRISES AT LEAST ONE SUBINTERVAL OF THE FIRST TIMESTAMP INTERVAL 1104

GENERATE INTERMEDIARY OPERATING CONDITION DATA BY AT LEAST SUBTRACTING THE FIRST OPERATING CONDITION DATA FROM THE DEFAULT OPERATING CONDITION DATA 1106

IDENTIFY SECOND OPERATING CONDITION DATA ASSOCIATED WITH A THIRD TIMESTAMP INTERVAL, WHEREIN THE THIRD TIMESTAMP INTERVAL COMPRISES AT LEAST AT LEAST ONE SUBINTERVAL OF THE SECOND TIMESTAMP INTERVAL 1108

GENERATING ADJUSTED OPERATING CONDITION DATA BY AT LEAST ADDING THE SECOND OPERATING CONDITION DATA TO THE INTERMEDIARY OPERATING CONDITION DATA 1110

GENERATING ADJUSTED OPTIMIZATION DATA BASED AT LEAST IN PART ON THE ADJUSTED OPERATING CONDITION DATA 1112

FIG. 11

APPARATUSES, COMPUTER-IMPLEMENTED METHODS, AND COMPUTER PROGRAM PRODUCTS FOR IMPROVED MULTI-MODAL OPTIMIZATION FOR PARTICULAR CONTROL SCHEMES

TECHNICAL FIELD

Embodiments of the present disclosure generally provide for improved optimization of processing unit(s), and specifically provide for improved optimization of processing unit(s) while satisfying underlying assumptions associated with operation of the processing unit(s) of a particular dynamic control scheme (e.g., an MPC architecture).

BACKGROUND

In various contexts, optimization of a particular oil refinery, petrochemical plant, or other ingredient processing plant that includes one or more components is performed to facilitate operation of the plant in a manner that meets goal criteria. Often, existing optimization algorithms operate based on particular underlying assumptions.

Applicant has discovered problems with current implementations of optimizing operation of a processing plant, specifically for plants including at least one multi-modal processing unit. Through applied effort, ingenuity, and innovation, Applicant has solved many of these identified problems by developing embodied in the present disclosure, which are described in detail below.

BRIEF SUMMARY

In one aspect, a computer-implemented method for improved multi-modal optimization of a dynamic control scheme (e.g., an MPC architecture) is provided. The example computer-implemented method includes generating default operating condition data associated with a first timestamp interval, where the default operating condition data represents a first value associated with a first operational mode of a processing unit of a processing plant, identifying first operating condition data associated at a second timestamp interval includes at least one subinterval of the first timestamp interval, where the first operating condition data represents the first value associated with the first operational mode of the processing unit, generating intermediary operating condition data by at least subtracting the first operating condition data from the default operating condition data, identifying second operating condition data associated with a third timestamp interval, includes at least one subinterval of the second timestamp interval, where the second operating condition data represents a second value associated with a second operational mode of the processing unit, generating adjusted operating condition data by at least adding the second operating condition data to the intermediary operating condition data, and generating adjusted optimization data based at least in part on the adjusted operating condition data.

The computer-implemented method may also further include generating a step response model matrix corresponding to the first operational mode, where the first operating condition data is generated based at least in part on the step response model matrix.

The computer-implemented method may also further include where identifying the first operating condition data includes detecting a first input pulse associated with the first value within the second timestamp interval, and detecting a second input pulse associated with the first value within the second timestamp interval, where the first operating condition data includes a portion of data defined between the first input pulse and the second input pulse.

The computer-implemented method may also further include where the first operating condition data includes a first feed rate associated with the first operational mode.

The computer-implemented method may also further include determining the subinterval of the first timestamp interval by at least determining at least one timestamp interval where the processing unit is scheduled to not operate in the first operational mode.

The computer-implemented method may also further include determining the first subinterval of the second timestamp interval by at least determining at least one timestamp interval where the processing unit is scheduled to operate in the second operational mode.

The computer-implemented method may also further include identifying at least one additional operating condition data associated with at least one additional timestamp interval, where the additional timestamp interval includes at least one additional subinterval of the second timestamp interval, where each additional operating condition data represents an additional value associated with at least one additional operational mode of the processing unit, where generating the adjusted operating condition data includes at least adding the second operating condition data and each additional operating condition data of the at least one additional operating condition data to the intermediary operating condition data.

The computer-implemented method may also further include where the default operating condition data is determined based on an ongoing operational assumption associated with at least the processing unit of the processing plant.

The computer-implemented method may also further include generating default optimization data based at least in part on the default operating condition data, where generating the adjusted optimization data includes applying the adjusted operating condition data to the default optimization data as at least one corrective offset. Other technical features may be readily apparent to one skilled in the art from the following figures, descriptions, and claims.

The computer-implemented method may also further include where identifying the first operating condition data includes determining, based at least in part on a pulse input model, a pulse input value associated with at least a first timestamp in the subinterval of the first timestamp interval, and identifying at least a portion of the first operating condition data corresponding to the first timestamp interval based at least in part on the pulse input value and the step response model matrix. Other technical features may be readily apparent to one skilled in the art from the following figures, descriptions, and claims.

In another aspect, an apparatus for improved multi-modal optimization of a dynamic control scheme (e.g., an MPC architecture) is provided. The example apparatus includes at least one processor and at least one non-transitory memory having computer program code stored thereon that, in execution with the at least one processor, causes the apparatus to perform any one of the example computer-implemented methods described herein.

In another aspect, a computer program product for improved multi-modal optimization in of a dynamic control scheme (e.g., an MPC architecture) is provided. The example computer program product includes at least one non-transitory computer-readable storage medium having computer program code stored thereon that, in execution with at least one processor, configures the computer program product to perform any one of the example computer-implemented methods described herein.

BRIEF DESCRIPTION OF THE SEVERAL
VIEWS OF THE DRAWINGS

To easily identify the discussion of any particular element or act, the most significant digit or digits in a reference number refer to the figure number in which that element is first introduced.

FIG. 11 illustrates a flowchart including operations of an example process for improved multi-modal optimization in accordance with at least one example embodiment of the present disclosure.

DETAILED DESCRIPTION

Figure 1:
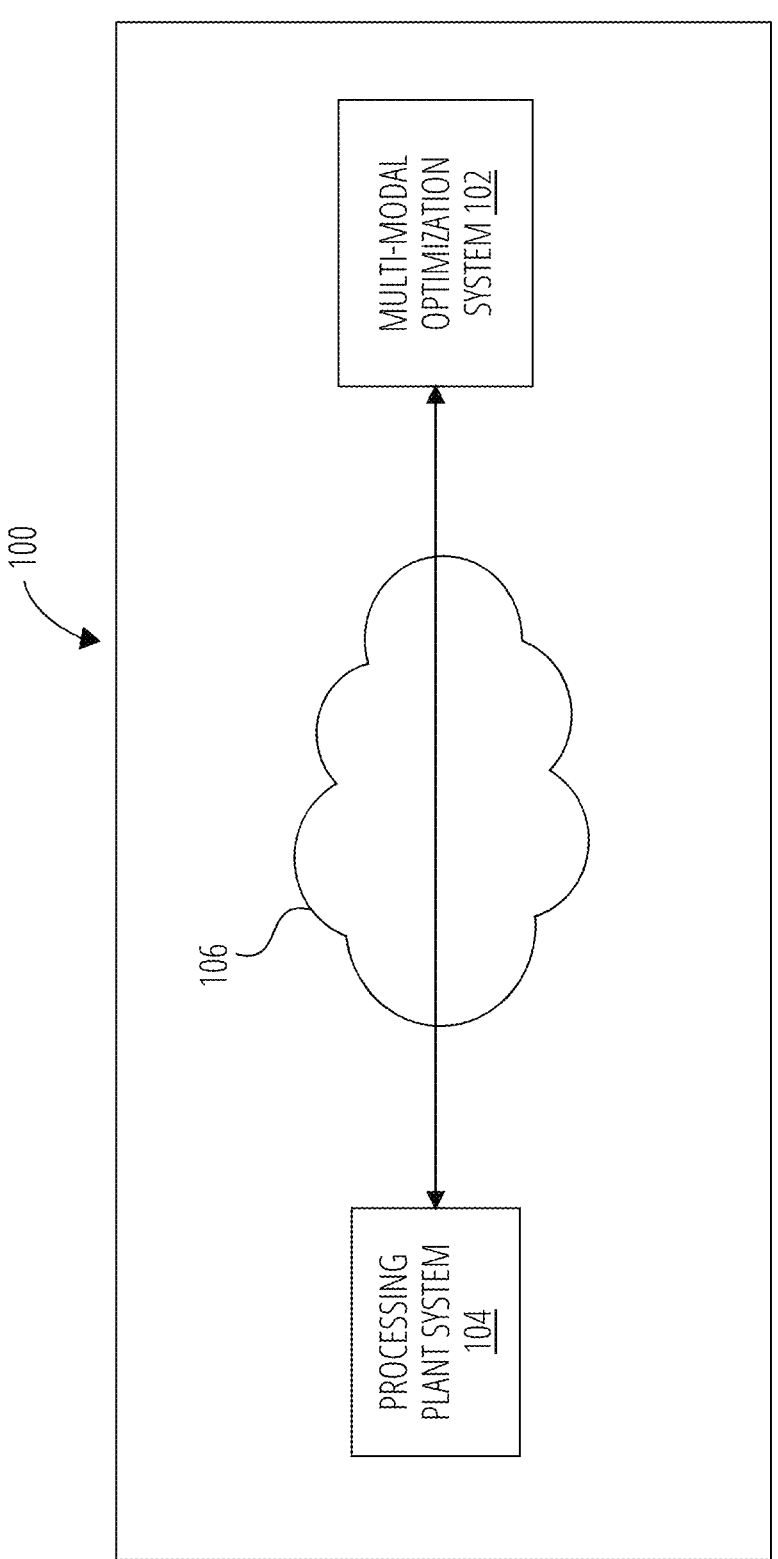
FIG. 1 illustrates a block diagram of an example system in which embodiments of the present disclosure may operate.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In various contexts, a processing plant operates to produce one or more final products by performing any number of intermediary processing steps on input ingredient(s). To this end, a processing plant may include any number of processing unit(s) that perform such processing step(s). In various contexts, one or more of such processing unit(s) is configured to operate in any one of a plurality of different modes. Each operational mode may represent receiving of a different input ingredient, rate of feed of a particular input ingredient, change in a configuration or step performed by the processing unit, and/or the like. In this regard, such multi-modal processing units may expand the capabilities of the processing plant without requiring alternative processing unit(s) for handling each such use case associated with a different operational mode.

Further, it is often desirable to optimize operation of a processing plant or particular processing unit based at least in part on one or more target parameter(s). For example, in some contexts a processing plant is optimized using an optimization process that optimizes a target parameter of profit generated by the processing plant over a particular period of time, taking into account various parameter(s) to yield particular final product amount(s), schedule(s), and/or other data utilized for controlling operation of the processing plant in a manner that maximizes, minimizes, or otherwise optimizes particular target parameter(s).

In various contexts, a plant-wide optimization process is utilized to generate optimized data for operating processing units of a particular processing plant. In such contexts, the plant-wide optimization process often relies on a model predictive control (MPC) architecture utilized as the foundation of the plant-wide optimization process. In this regard, the underlying control scheme utilized for one or more processing unit(s) (e.g., an MPC architecture) may not be changeable, however underlying assumptions associated with the control scheme may cause problems for the plant-wide optimization process in circumstances where a multi-modal processing unit is considered. For example, plant-wide optimization based at least in part on the underlying control scheme relies on a default assumption that the current operating conditions of each processing unit remains static over the entirety of the timestamp interval to be optimized (e.g., such that a current operational mode remains active, for example). When the multi-modal operation of the processing unit is to occur, the plant-wide optimization often produces incorrect results due to violation of this default assumption. The existence of multiple operational modes for consideration breaks the fundamental assumption that the predictor is based on, which is the default assumption that the future input remains a constant at the current value at the timestamp that the optimization occurs. While such plantwide optimization processes may function as intended in multiple other use cases, relying solely on such plant-wide optimization processes without additional steps for handling the multi-modal options of particular processing unit(s) would render the plant-wide optimization process useless in various circumstances. Any such additional steps that resolve this issue, however, must also be performable cleanly and efficiently to maintain the efficient nature of such plant-wide optimization processes. While it may be theoretically possible to rewrite and otherwise reconfigure a control scheme entirely to remove such an assumption, it is not immediately clear how to do so, and such a process would be costly and time consuming, require significant engineering and programming time to successfully reconfigure, could cause issues with legacy implementations of the control scheme, and otherwise requires significant actions that are not worthwhile.

Embodiments of the present disclosure resolve these problems by providing efficient, corrective responses without modifying the underlying control scheme and without violating the default assumption(s) associated with the control scheme. In this regard, embodiments of the present disclosure may be utilized to modify existing plant-wide optimization processes in a manner that accounts for multi-modal operation of one or more processing unit(s). Specifically, embodiments of the present disclosure rely on the underlying default assumption required by the control scheme to generate or otherwise identify default operating condition data that satisfies the default assumption associated with the control scheme. The default operating condition data is updated to generate intermediary operating condition data by removing one or more portion(s) of data at timestamp intervals where the default mode (e.g., to satisfy the default assumption, the current operational mode at the time of optimization) is determined not to be active. Subsequently, additional operating condition data identified corresponding to other operational modes is included in the intermediary operating condition data. Each additional operating condition data corresponding to a particular other operational mode may be included at particular timestamp intervals during which the particular other operational mode is to be active. In this regard, the intermediary operating condition data may be updated with such additional operating condition data portions to generate adjusted operating condition data for a particular mode schedule. Utilizing the adjusted operating condition data, corresponding adjusted optimization data is determinable, for example where the adjusted operating condition data represents or is utilized to derive corrective response values to default optimization data generated via the plant-wide optimization process based on the default assumptions.

Embodiments of the present disclosure are implementable for particular optimizations. For example, in some embodiments, the corrective response determination and use for adjusting the default optimization data is activated in circumstances where a processing unit is under modal operations or a series of events representing operational changes are scheduled, for example in a mode schedule. In this regard, embodiments of the present disclosure may be combined with the default optimization processes to expand the contexts in which the plant-wide optimization may be accurately performed, such that the processing unit(s) of the processing plant may be operated accordingly.

Definitions

"Adjusted operating condition data" refers to electronically managed data representing default operating condition data modified based on operating condition data corresponding to at least one additional operational mode of a processing unit.

"Adjusted optimization data" refers to electronically managed data representing default optimization data modified based at least in part on derived operating condition data for a plurality of operational modes associated with a particular processing unit.

"Default operating condition data" refers to electronically managed data representing operating condition data for a particular operational mode associated with a processing unit. In some embodiments, default operating condition data corresponds to a default operational mode, or the current mode in which the processing unit is operating.

"Default optimization data" refers to electronically managed data representing the output of a default optimization algorithm, where the default optimization algorithm is based on a particular operational mode of a processing unit.

"Feed rate" refers to a rate of an input ingredient flowing into a processing unit of a processing plant in a particular operational mode.

"Input pulse" refers to a value of a signal controlling an operational mode of a processing unit. In some embodiments, the value of an input pulse increases to a particular value corresponding to an operational mode at a timestamp when the processing unit begins operating in the particular operational mode, and the input pulse decreases from the particular value corresponding to the operational mode at a second timestamp when the processing unit ceases operating in the particular operational mode.

"Intermediary operating condition data" refers to electronically managed data representing default operating condition data modified based at least in part on operating condition data corresponding to at least one other operational mode associated with a processing unit.

"Mode schedule" refers to a plurality of time intervals during which a particular processing unit or processing plant is scheduled to operate utilizing different parameter(s), configuration(s), and/or process(es), each representing a different operational mode.

"MPC architecture" refers to a computing environment embodied in hardware, software, firmware, and/or a combination thereof, that performs model predictive control (MPC).

"Multi-modal" refers to a plurality of operational modes to which a particular processing unit may be set to operate based on said set operational mode.

"Operating condition data" refers to electronically managed data representing a value corresponding to an operational parameter of a processing unit representing particular operation of the processing unit at one or more particular timestamp(s) or during particular timestamp interval(s). Non-limiting examples of operating condition data includes a value representing a feed rate of an ingredient for a processing unit, an operating temperature of a processing unit, an operating pressure of a processing unit, and a volume input of an ingredient of a processing unit.

"Operational mode" refers to a selectable mode of operation for a particular processing unit, where the operational mode impacts an ingredient being input to the processing unit and/or a rate or amount at which a particular processing unit receives the ingredient.

"Optimization data" refers to data usable to control operation of one or more processing unit(s) of a processing plant in a manner that minimizes, maximizes, or otherwise optimizes a value of a desired target parameter.

"Processing plant" refers to a system of interconnected processing units that provides one or more input ingredient(s) and, utilizing one or more transformations performed by one or more of the processing units, transforms the one or more input ingredient(s) into at least one final product. Non-limiting examples of a processing plant include an oil refinery, a petrochemical plant, and a chemical processing plant.

"Processing unit" refers to any machine, system, component, or hardware within a processing plant that stores, routes, controls, processes, blends, or otherwise interacts with one or more ingredients. Non-limiting examples of a processing unit include a blender, a hydrocracker, a different crude units, an aromatics reduction unit, a visbreaker, a de-waxer, an isomerization unit, a hydrotreating unit, a vapor recovery unit, and an intermediary storage.

"Pulse input model" refers to one or more algorithmic, statistical, and/or machine learning model(s) that determines a pulse input value from a particular signal associated with operation of a processing unit.

"Pulse input value" refers to electronically managed data representing a value of a signal representing a pulse that operates a processing unit in a particular operational mode.

"Timestamp interval" refers to electronically managed data representing a length of time.

Example Systems and Apparatuses of the Disclosure

FIG. 1 illustrates a block diagram of a system that may be specially configured within which embodiments of the present disclosure may operate. Specifically, FIG. 1 depicts an example system 100. As illustrated, the system 100 includes a processing plant system 104 in communication with an optimized control system 102. In some embodiments, the processing plant system 104 communicates with the multi-modal optimization system 102 over one or more communications network(s), for example a communications network 106.

It should be appreciated that the communications network 106 in some embodiments is embodied in any of a myriad of network configurations. In some embodiments, the communications network 106 embodies a public network (e.g., the Internet). In some embodiments, the communications network 106 embodies a private network (e.g., an internal localized, or closed-off network between particular devices). In some other embodiments, the communications network 106 embodies a hybrid network (e.g., a network enabling internal communications between particular connected devices and external communications with other devices). The communications network 106 in some embodiments includes one or more base station(s), relay(s), router(s), switch(es), cell tower(s), communications cable(s) and/or associated routing station(s), and/or the like. In some embodiments, the communications network 106 includes one or more user controlled computing device(s) (e.g., a user owned router and/or modem) and/or one or more external utility devices (e.g., Internet service provider communication tower(s) and/or other device(s)).

Each of the components of the system 100 communicatively coupled to transmit data to and/or receive data from one another over the same or different wireless and/or wired networks embodying the communications network 106. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network 106, the various embodiments are not limited to this architecture. In other embodiments, one or more computing entities share one or more components, hardware, and/or the like, or otherwise are embodied by a single computing device such that connection(s) between the computing entities are over the communications network 106 are altered and/or rendered unnecessary. For example, in some embodiments, the processing plant system 104 includes some or all of the multi-modal optimization system 102, such that an external communications network 106 is not required.

In some embodiments, the processing plant system 104 and the multi-modal optimization system 102 are embodied in an on-premises system within or associated with the processing plant. In some such embodiments, the processing plant system 104 and the optimized control system 102 are communicatively coupled via at least one wired connection. Alternatively or additionally, in some embodiments, the processing plant system 104 embodies or includes the representative processing system 102, for example as a software component of a single enterprise terminal.

The processing plant system 104 includes any number of computing device(s), system(s), physical component(s), and/or the like, that facilitates producing of any number of products, for example utilizing particular configurations that cause processing of particular inputs available within the processing plant system 104. In some embodiments, the processing plant system 104 includes one or more physical component(s), connection(s) between physical component(s), and/or computing system(s) that control operation of each physical component therein. In one example context, the processing plant system 104 embodies a refinery plant, which includes physical component(s) embodying rundown blender(s), product tank(s), or other component(s) that perform particular process(es) to alter properties of inputs to the component, crude flow unit(s), piping between such physical component(s), valve(s) controlling flow between the physical component(s), and/or the like. Additionally or alternatively, in some embodiments the processing plant system 104 includes one or more computing system(s) that are specially configured to operate the physical component(s) in a manner that produces one or more particular product(s) simultaneously. In some embodiments, a processing plant system 104 includes one or more computing device(s) and/or system(s) embodied in hardware, software, firmware, and/or a combination thereof, that configure and/or otherwise control operation of one or more physical component(s) in the processing plant. For example, in some embodiments, such computing device(s) and/or system(s) include one or more programmable logic controller(s), MPC(s), application server(s), centralized control system(s), and/or the like, that control(s) configuration and/or operation of at least one physical component. It will be appreciated that different processing plant system(s) may include different physical component(s), computing system(s), and/or the like. For example, different refinery plants may include different components, different number of components, different types of components, and/or the like, that cause the processing plant system to operate differently from other refinery plants.

The multi-modal optimization system 102 includes one or more computing device(s) and/or system(s) embodied in hardware, software, firmware, and/or a combination thereof, that performs optimization process(es) associated with at least one processing unit based at least in part on a plurality of operational modes. In some embodiments, the multi-modal optimization system 102 includes one or more specially configured application server(s), database server(s), end user device(s), cloud computing system(s), and/or the like. Additionally or alternatively, in some embodiments, the multi-modal optimization system 102 includes one or more client devices, user devices, and/or the like, that enables access to functionality provided via the multi-modal optimization system 102, for example via a web application, native application, and/or the like.

In some embodiments, the multi-modal optimization system 102 is configured to perform an optimization process based on default assumption(s) associated with a particular dynamic control scheme (e.g., an MPC architecture). For example, in some embodiments, the multi-modal optimization system 102 generates optimization data by adjusting default optimization data based at least in part on operating condition data corresponding to each operational mode of a plurality of operational modes. For example, in some embodiments, the multi-modal optimization system 102 generates operating condition data corresponding to different timestamp intervals during which different operational modes are to be initiated. In some such embodiments, the multi-modal optimization system 102 generates target operating condition data corresponding to a particular mode schedule. In some embodiments, the multi-modal optimization system 102 generates the target operating condition data by subtracting particular portions of default operating condition data and combining the remaining intermediary operating condition data with one or more other portion(s) of operating condition data corresponding to other operational modes.

In some embodiments, the multi-modal optimization system 102 and/or processing plant system 104 communicate with one another to perform the various actions described herein. For example, in some embodiments, the multi-modal optimization system 102 and the processing plant system 104 communicate to generate corrective responses for default optimization data generated based at least in part on default assumptions associated with operations of the control scheme (e.g., the underlying MPC architecture). Additionally or alternatively, in some embodiments, the multi-modal optimization system 102 and the processing plant system 104 communicate to facilitate control of the processing plant based at least in part on the generated optimization data. For example, in some embodiments the multi-modal optimization system 102 and the processing plant system 104 communicate to configure one or more physical component(s) of the processing plant to produce particular product(s) based at least in part on the optimization data.

Figure 2:
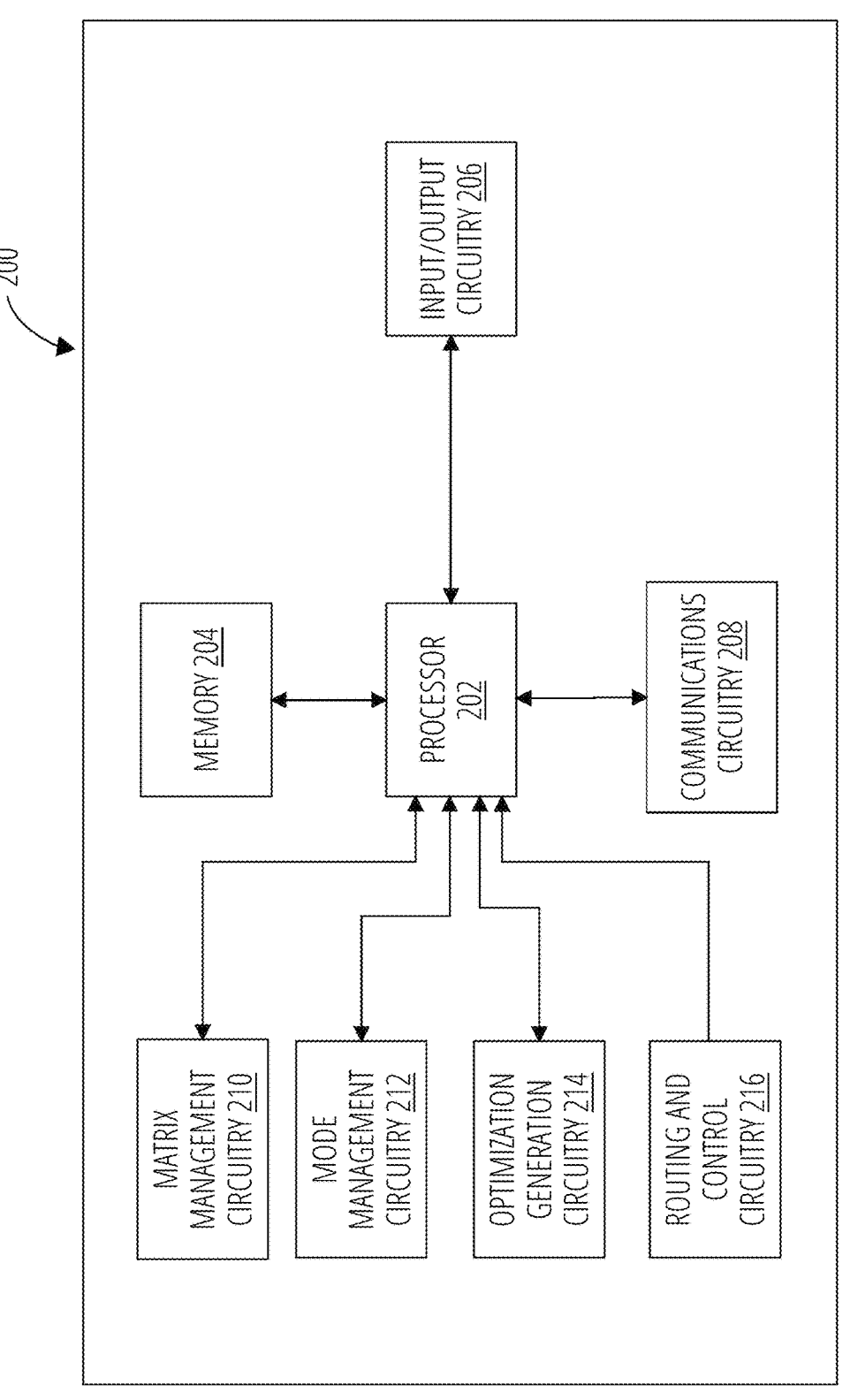
FIG. 2 illustrates a block diagram of an example apparatus in accordance with at least one example embodiments of the present disclosure.

FIG. 2 illustrates a block diagram of an example apparatus that may be specially configured in accordance with at least one example embodiment of the present disclosure. Specifically, FIG. 2 depicts an example multi-modal optimization apparatus 200 ("apparatus 200") specially configured in accordance with at least some example embodiments of the present disclosure. In some embodiments, the multi-modal optimization system 102 and/or a portion thereof is embodied by one or more system(s), such as the apparatus 200 as depicted and described in FIG. 2. The apparatus 200 includes processor 202, memory 204, input/output circuitry 206, communications circuitry 208, matrix management circuitry 210, mode management circuitry 212, optimization generation circuitry 214, and/or routing and control circuitry 216. In some embodiments, the apparatus 200 is configured, using one or more of the sets of circuitry embodied by processor 202, memory 204, input/output circuitry 206, communications circuitry 208, matrix management circuitry 210, mode management circuitry 212, optimization generation circuitry 214, and/or routing and control circuitry 216, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with performing improved multi-modal optimization associated with a corresponding dynamic control scheme (e.g., an MPC architecture). In some such embodiments, the processor 202 is configured to generate adjusted optimization data that corresponds to particular operations in a plurality of operational modes. For example, in some embodiments, the processor 202 includes hardware, software, firmware, and/or a combination thereof, that generates default operating condition data associated with a first timestamp interval. The default operating condition data in some embodiments represents a first value associated with a first operational mode of a processing unit of a processing plant, for example based at least in part on a default assumption associated with the underlying control scheme (e.g., an MPC architecture). For example, in some embodiments, the default operating condition data corresponds to an assumption of continued execution of a current operational mode at the time of optimization. Additionally or alternatively, in some embodiments, the processor 202 includes hardware, software, firmware, and/or a combination thereof, that identifies first operating condition data associated with a second timestamp interval, where the second timestamp interval comprises a subinterval of the first timestamp interval, and where the first operating condition data represents the first value associated with the first operational mode of the processing unit. Additionally or alternatively, in some embodiments, the processor 202 includes hardware, software, firmware, and/or a combination thereof, that generates intermediary operating condition data by at least removing the first operating condition data from the default operating condition data. In some embodiments, the processor 202 subtracts the first operating condition data from the default operating condition data. Additionally or alternatively, in some embodiments, the processor 202 includes hardware, software, firmware, and/or a combination thereof, that identifies second operating condition data associated with a third timestamp interval, wherein the third timestamp interval comprises at least a first subinterval of the second timestamp interval, where the second operating condition data represents a second value associated with a second operational mode of the processing unit. Additionally or alternatively, in some embodiments, the processor 202 includes hardware, software, firmware, and/or a combination thereof, that generates adjusted operating condition data by at least including the second operating condition data to the intermediary operating condition data. For example, in some embodiments, the processor 202 adds additional operating condition data for each of a plurality of additional operational modes, for example including at least the second operating condition data, to the intermediary operating condition data. Additionally or alternatively, in some embodiments, the processor 202 includes hardware, software, firmware, and/or a combination thereof, that generates adjusted optimization data based at least in part on the adjusted operating condition data. Additionally or alternatively, in some embodiments, the processor 202 includes hardware, software, firmware, and/or a combination thereof, that stores, outputs, and/or further processes adjusted operating condition data.

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

In some embodiments, the apparatus 200 includes matrix management circuitry 210. The matrix management circuitry 210 includes hardware, software, firmware, and/or a combination thereof, that supports generation, maintenance, and/or use of a step response model matrix. For example, in some embodiments, the matrix management circuitry 210 includes hardware, software, firmware, and/or a combination thereof, that retrieves a step response model matrix corresponding to a processing plant, for example where the step response model matrix represents processing unit(s) and/or connections therebetween of the processing plant.

Additionally or alternatively, in some embodiments, the matrix management circuitry 210 includes hardware, software, firmware, and/or a combination thereof, that generates a step response model matrix corresponding to a particular processing unit, for example based at least in part on automatically determined data signal(s) associated with the layout of the processing plant and/or user input representing the layout of the processing plant. In some embodiments, the matrix management circuitry 210 identifies a step response model matrix (e.g., by retrieving or generating the step response model matrix) generated utilizing any of a number of known methodologies. Additionally or alternatively, in some embodiments, the matrix management circuitry 210 includes hardware, software, firmware, and/or a combination thereof, that identifies operating condition data based at least in part on input pulse(s) and the step response model matrix. In some embodiments, mode management circuitry 212 includes a separate processor, specially configured field programmable gate array (FPGA), or a specially programmed application specific integrated circuit (ASIC).

In some embodiments, the apparatus 200 includes mode management circuitry 212. The mode management circuitry 212 includes hardware, software, firmware, and/or a combination thereof, that supports identifying operating condition data corresponding to particular operational modes. For example, in some embodiments, the mode management circuitry 212 includes hardware, software, firmware, and/or a combination thereof, that identifies, retrieves, and/or generates a mode schedule corresponding to a particular processing unit and/or processing plant. Additionally or alternatively, in some embodiments, the mode management circuitry 212 includes hardware, software, firmware, and/or a combination thereof, that generates default operating condition data. Additionally or alternatively, in some embodiments, the mode management circuitry 212 includes hardware, software, firmware, and/or a combination thereof, that generates operating condition data corresponding to a particular operational mode and/or timestamp interval. In some such embodiments, the operating condition data for one or more operational mode(s) is identified based at least in part on a mode schedule, for example where the operating condition data corresponds to a timestamp interval during which a corresponding operational mode is active in the mode schedule. Additionally or alternatively, in some embodiments, the mode management circuitry 212 includes hardware, software, firmware, and/or a combination thereof, that generates intermediary operating condition data, for example by removing one or more portion(s) of operating condition data from the default operating condition data. Additionally or alternatively, in some embodiments, the mode management circuitry 212 includes hardware, software, firmware, and/or a combination thereof, that generates adjusted operating condition data, for example by including one or more portion(s) of operating condition data to intermediary operating condition data. In some embodiments, mode management circuitry 212 includes a separate processor, specially configured field programmable gate array (FPGA), or a specially programmed application specific integrated circuit (ASIC).

In some embodiments, the apparatus 200 includes optimization generation circuitry 214. The optimization generation circuitry 214 includes hardware, software, firmware, and/or a combination thereof, that supports generation of optimization data associated with a processing unit and/or processing plant. For example, in some embodiments, the optimization generation circuitry 214 includes hardware, software, firmware, and/or a combination thereof, that generates default optimization data. In some embodiments, the default optimization data is generated based at least in part on corresponding default operating condition data, which is based at least in part on default assumptions associated with optimization in the dynamic control scheme. Additionally or alternatively, in some embodiments, the optimization generation circuitry 214 includes hardware, software, firmware, and/or a combination thereof, that generates adjusted optimization data. In some such embodiments, the optimization generation circuitry 214 generates the adjusted optimization data based at least in part on adjusted operating condition data generated via the apparatus 200. Additionally or alternatively, in some embodiments, the optimization generation circuitry 214 includes hardware, software, firmware, and/or a combination thereof, that generates adjusted optimization data by adjusting the default optimization data based at least in part on the adjusted operating condition data. In some embodiments, the optimization generation circuitry 214 includes a separate processor, specially configured field programmable gate array (FPGA), or a specially programmed application specific integrated circuit (ASIC).

In some embodiments, the apparatus 200 includes routing and control circuitry 216. The routing and control circuitry 216 includes hardware, software, firmware, and/or any combination thereof, that informs controlling of one or more processing unit(s) based at least in part on optimization data. For example, in some embodiments, the routing and control circuitry 216 includes hardware, software, firmware, and/or any combination thereof, that causes operation of a physical component embodying a processing unit based at least in part on the optimization data. In some such embodiments, the routing and control circuitry 216 initiates or output commands or instructions for controlling the processing unit, or a plurality of processing units of a processing plant, in a manner that operates the processing unit(s) in a manner that optimizes one or more target parameter(s) (e.g., profit, emissions, efficiency, and/or the like). In some embodiments, the routing and control circuitry 216 configures one or more processing unit(s), for example to route particular ingredient(s), amount(s) of ingredient(s), and/or the like, in a manner determined to be optimized based at least in part on the optimization data. Additionally or alternatively, in some embodiments, the routing and control circuitry 216 includes hardware, software, firmware, and/or any combination thereof, that causes outputting of optimization data, for example adjusted optimization data, to one or more user interface(s) to enable a user to control operation of a processing unit, or multiple processing unit(s), in accordance with the optimization data. In some embodiments, routing and control circuitry 216 includes a separate processor, specially configured field programmable gate array (FPGA), or a specially programmed application specific integrated circuit (ASIC).

Additionally or alternatively, in some embodiments, two or more of the sets of circuitries embodying processor 202, memory 204, input/output circuitry 206, communications circuitry 208, matrix management circuitry 210, mode management circuitry 212, optimization generation circuitry 214, and/or routing and control circuitry 216. Alternatively or additionally, in some embodiments, one or more of the sets of circuitry perform some or all of the functionality described associated with another component. For example, in some embodiments, two or more of the sets of circuitry embodied by processor 202, memory 204, input/output circuitry 206, communications circuitry 208, matrix management circuitry 210, mode management circuitry 212, optimization generation circuitry 214, and/or routing and control circuitry 216, are combined into a single module embodied in hardware, software, firmware, and/or a combination thereof. Similarly, in some embodiments, one or more of the sets of circuitry, for example matrix management circuitry 210, mode management circuitry 212, optimization generation circuitry 214, and/or routing and control circuitry 216, is/are combined with the processor 202, such that the processor 202 performs one or more of the operations described above with respect to each of these sets of circuitry embodied by the matrix management circuitry 210, mode management circuitry 212, optimization generation circuitry 214, and/or routing and control circuitry 216.

Example Processing Plant Implementations and Representations

Figure 3:
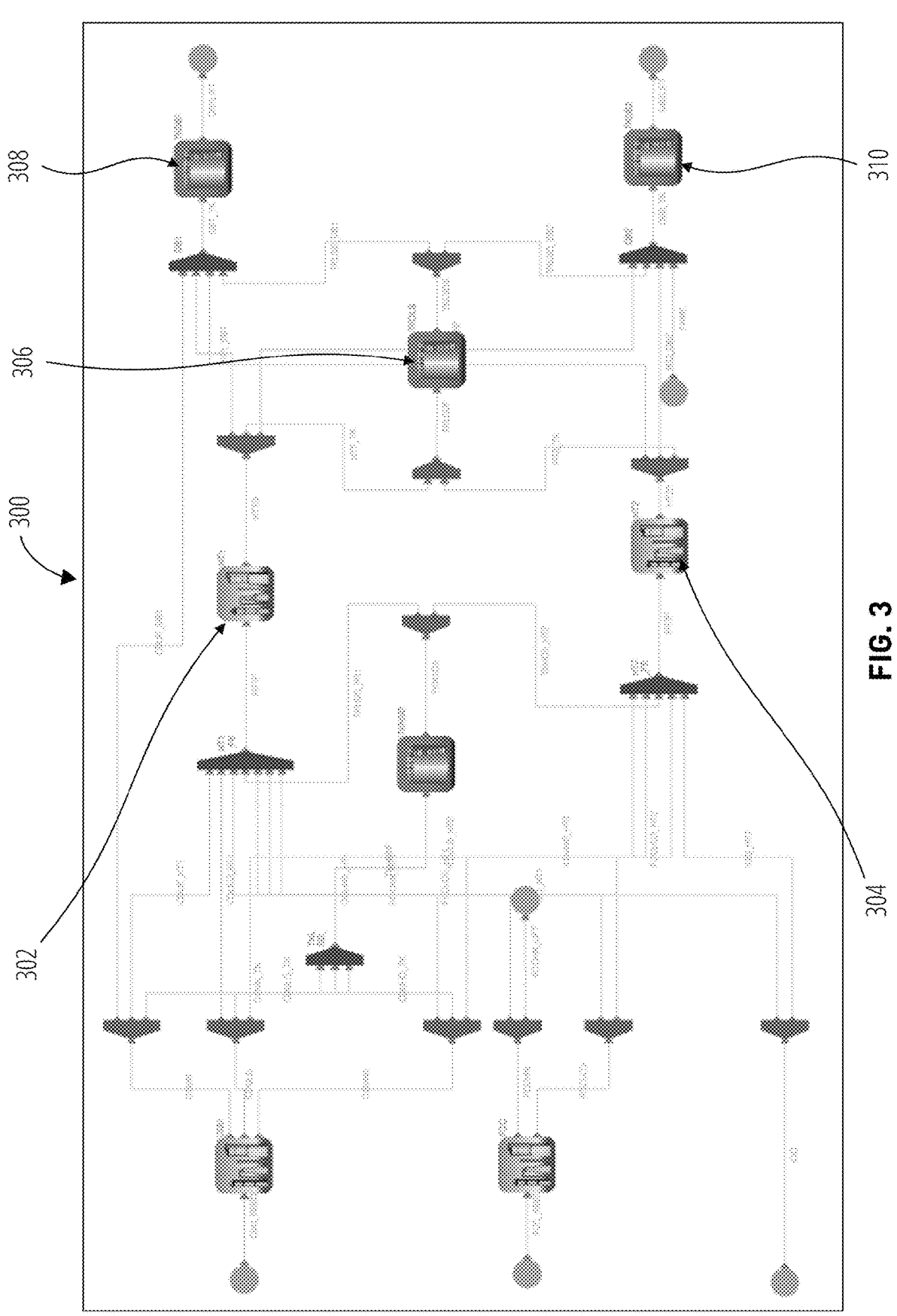
FIG. 3 illustrates a flowsheet model visualization of an example processing plant in accordance with at least one example embodiments of the present disclosure.

FIG. 3 illustrates a flowsheet model visualization of an example processing plant in accordance with at least one example embodiments of the present disclosure. Specifically, FIG. 3 depicts an example processing plant representation 300. The processing plant representation 300 depicts a layout and configuration of a particular processing plant, for example having one or more processing unit(s) that produce a final product from one or more input product(s). As illustrated, the example processing plant is an oil refinery. It will be appreciated that in other embodiments, other processing plants may be utilized.

In some embodiments, the processing units depicted in the processing plant representation 300 source a particular product, utilize the product as input, and/or processing incoming input products in a particular manner. For example, as illustrated, the processing plant representation 300 may include representations corresponding to crude flow units, hydro treating processing units, reforming processing units, isomerization processing units, aromatics reduction processing units, and the like. Such processing units are depicted as connected via physical connections to one or more other upstream and/or downstream unit(s). Additionally or alternatively, in some embodiments, the processing units represented in the processing plant representation 300 include one or more blender(s), storage tank(s), intermediary tank(s), product source(s), and/or the like.

In some embodiments, one or more of the processing units represented in the processing plant representation 300 each flow to one or more other processing units of the processing plant during operation of the processing plant. In this regard, during operation of the processing plant and at a particular time slice, one or more of such processing units may be set to a particular configuration and operate in conjunction with one another to produce a particular target product, for example based at least in part on input product(s) received via the processing unit(s) represented by the representations 302-310. The processing plant may include one or more blender(s), for example corresponding to representations 308 and 310, that embodies a processing unit and a final storage for a particular type of final product. For example, in some such embodiments, the blender(s) may be accessed to lift a final product for subsequent transport and/or use (e.g., by a customer) in accordance with a lift schedule. It will be appreciated that different processing plants may include any number, type, and/or configuration of different processing units, for example based at least in part on the final products to be produced by the processing plant.

As illustrated, the processing plant representation 300 includes a number of representations corresponding to various processing units of the depicted processing plant, including representations 302-310 representing various processing units of the processing plant. Any of the processing units corresponding to the representations 302-310 embodies a multi-modal processing unit, where the processing unit may be configured to operate in any one of a plurality of different operational modes. The different operational modes in some embodiments corresponds to receiving a different input ingredient, processing an input ingredient in a different manner, initiating different process(es) performed by the processing unit, and/or the like, or any combination thereof. In one example context, a particular boiler or other processing unit may be configured in a first operational mode to heat to a first temperature, and in a second operational mode to heat to a second temperature, for example to process an input ingredient at that temperature. In some such contexts, the processing unit may receive different input ingredients (e.g., from upstream processing unit(s) and/or other component(s) associated with the processing plant) for further processing in a particular mode schedules, for example such that different input ingredients are processed at a particular temperature to process the input ingredient for producing a particular desired target product.

It will be appreciated that in some embodiments the processing units corresponding to representations 302-310 may be updated independently from one another, for example such that a particular operational mode is set for a particular processing unit individually during a particular timestamp interval. In some embodiments multiple of the processing units corresponding to the representations 302-310 are updated simultaneously. For example, in some embodiments, the processing plant may be set to a particular operational mode such that the processing plant is simultaneously configured to set each processing unit to a particular operational mode for generating a particular final product.

Similarly, in some embodiments, optimization is performable at a particular unit-level. In this regard, optimization data associated with operation of a particular processing unit may be generated based at least in part on the operating condition data associated with that particular processing unit. For example, corrective responses may be generated as described to adjust default optimization data based at least in part on the corrective responses to generate corresponding adjusted optimization data for that processing unit. In this regard, unit-wide adjusted optimization data may be generated based on unit-wide default optimization data that similarly corresponds to the particular processing unit being optimized.

Additionally or alternatively, in some embodiments, improved optimization is performable for a plurality of multi-modal processing units in a plant-wide optimization. In this regard, individual corrective response (e.g., to apply to optimizations) may be performed for each of the multi-modal units, resulting in a superposition of corrective responses from each of such processing units based on the planned execution of operational modes. Based on the individual corrective responses, adjusted optimization data for default optimization data representing a plant-wide optimization may be derived from the superposition of the individual corrective responses. In this regard, it will be appreciated that the individual process of generating corrective response values may be repeated for any number of processing units and applied to default plantwide optimization data that corresponds to the results of a default optimization scheme (e.g., a standard MPC optimization scheme for a processing plant or any other dynamic optimization scheme known in the art) for purposes of optimizing the operations of the processing plant as a whole.

Specifically, in some embodiments, the adjusted optimization data generated as described herein represents corrected response prediction(s) for one or more processing units. The corrected response values embodying a corrective response prediction then may be used as a computation starting point by a default optimization procedure, such as in a plant-wide optimization scheme, an MPC optimization scheme, or another dynamic control scheme. Advantageously, use of such corrected response values enables only the response prediction to be corrected, and the remaining optimization scheme otherwise stays intact and can be utilized as if the multi-modal operation of one or more processing unit(s) do not have any effect on such optimizations.

Example Visualizations of Operating Condition
Data and Processing Thereof

Figure 4:
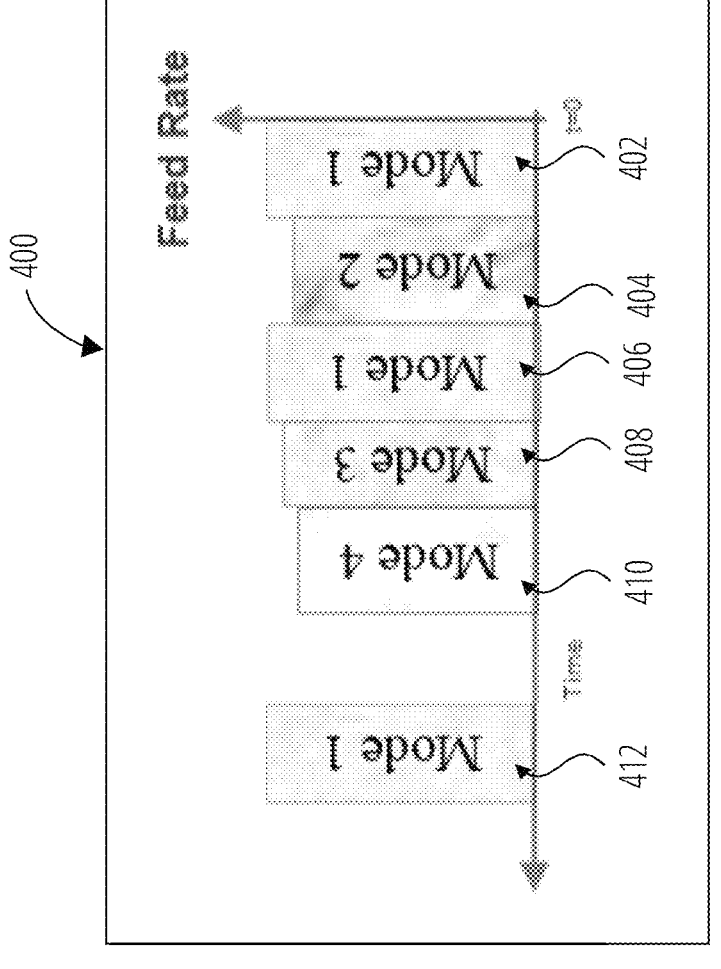
FIG. 4 illustrates a visualization of operating condition data associated with a plurality of operational modes in accordance with at least one example embodiment of the present disclosure.

FIG. 4 illustrates a visualization of operating condition data associated with a plurality of operational modes in accordance with at least one example embodiment of the present disclosure. Specifically, FIG. 4 depicts an example visualization of a mode schedule 400. In some embodiments, the apparatus 200 as depicted and described herein receives or otherwise generates one or more data object(s) embodying the mode schedule 400. For example, in some embodiments, the apparatus 200 receives user input embodying each portion of the mode schedule 400, such as where the user input defines particular a particular operational mode to be set for a particular processing unit for a particular timestamp interval, or a plurality of operational modes to set for the particular processing unit for a plurality of timestamp intervals. In other embodiments, the mode schedule is automatically generated and/or determined via one or more data-driven determination (e.g., a time-based schedule, a data-detected event, and/or the like).

The mode schedule 400 includes a plurality of portions of operating condition data for a plurality of operational modes and corresponding timestamp intervals during which a particular operational mode is to be active. As depicted, the operating condition data represents a particular feed rate, for example at which a particular input ingredient is to be inputted to the processing unit. For example, in some embodiments, the feed rate corresponds to a particular feed rate of crude inputted to the processing unit. In some embodiments, the different operational modes correspond to input of different ingredients in addition to the depicted differences in feed rates.

As depicted, the mode schedule 400 includes data corresponding to various timestamp intervals. The mode schedule 400 depicts operating condition data corresponding to each timestamp interval t(0) through t(n), with each number corresponding to a different timestamp interval. For example, the mode schedule 400 includes operating condition data 402 corresponding to a first timestamp interval t0-t1, operating condition data 404 corresponding to a second timestamp interval t1 to t2, operating condition data 406 corresponding to a third timestamp interval t2 to t3, operating condition data 408 corresponding to a fourth timestamp interval t3 to t4, operating condition data 410 corresponding to a fifth timestamp interval t4 to t5, and so on until operating condition data 412 corresponding to a sixth timestamp interval t(n−1) to t(n).

The various operating condition data depicted associated with the mode schedule 400 includes operating condition data corresponding to a plurality of operational modes. For example, as illustrated, operating condition data 402, operating condition data 406, and operating condition data 412 represent individual data portions associated with a first operational mode. In this regard, the mode schedule 400 indicates that a processing unit corresponding to the mode schedule 400 is to be set to a first operational mode during the timestamp intervals as representing within the mode schedule 400. Similarly, as illustrated, the operating condition data 404 represents an individual data portion associated with a second operational mode, the operating condition data 408 represents an individual data portion associated with a third operational mode, and the operating condition 410 represents an individual data portion associated with a fourth operational mode. It will be appreciated that any of a number of operational modes may be represented in a mode schedule, such as the mode schedule 400.

In some embodiments, each portion of operating condition data includes a data value representing a particular feed rate of a particular input ingredient. As illustrated, the data value representing the feed rate corresponds to the height of the corresponding data portion represented in the visualization in FIG. 4. Additionally or alternatively, in some embodiments, each portion of operating condition data includes one or more data value(s) representing a timestamp interval (e.g., a start timestamp and an end timestamp, a start timestamp and a duration, and/or the like). As illustrated, the data value(s) representing the timestamp interval corresponds to the width of the corresponding data portion represented in the visualization in FIG. 4.

In some embodiments, the mode schedule 400 represents target operating condition data for configuring a corresponding processing unit across a larger timestamp interval. For example, the mode schedule 400 in some embodiments represents operations corresponding to a physical multi-modal unit. In some embodiments, the mode schedule 400 is generated via an optimization process as described herein.

In some embodiments, an optimization system, for example embodied by the apparatus 200, receives the mode schedule 400. The apparatus 200 subsequently processes the received mode schedule 400 as described herein to determine and/or otherwise generate adjusted optimization data corresponding to the various portions of the mode schedule 400. The mode schedule 400 in some embodiments is received in response to user engagement with the apparatus 200, or a corresponding client device, where the user engagement defines, creates, uploads, or otherwise inputs the mode schedule 400 for processing. Additionally or alternatively, in some embodiments, the apparatus 200 retrieves the mode schedule 400 from a data repository that stores one or more mode schedule(s) defined over one or more timestamp interval(s).

Figure 5:
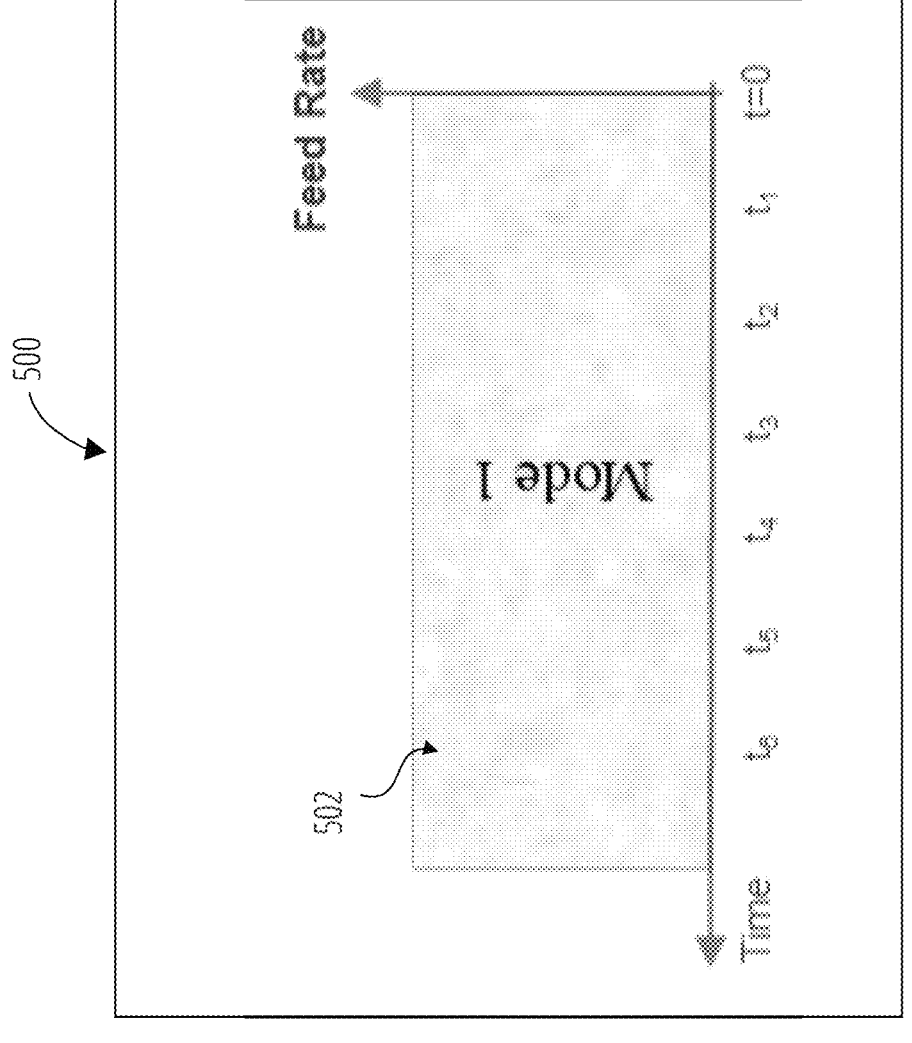
FIG. 5 illustrates a visualization of default operating condition data in accordance with at least one example embodiment of the present disclosure.

FIG. 5 illustrates a visualization of default optimization data corresponding to default operating condition data in accordance with at least one example embodiment of the present disclosure. Specifically, FIG. 5 depicts an example visualization of default optimization data 500. In some embodiments, the apparatus 200 as depicted and described herein receives or otherwise generates one or more data object(s) embodying the default optimization data 500. For example, in some embodiments, the apparatus 200 generates the default optimization data 500 utilizing a default optimization process, for example an optimization process configured based at least in part on one or more default assumptions, for example default assumption(s) associated with a dynamic control scheme (e.g., an MPC architecture).

In some embodiments, the default optimization data 500 is generated based at least in part on default operating condition data 502. In some embodiments, for example, the default operating condition data 502 is generated based at least in part on a default assumption associated with a dynamic control scheme (e.g., an MPC architecture) configuring operation of the corresponding processing unit, where the default assumption represents that a particular default or current operational mode continues for the entire timestamp interval for which optimization is performed. In this regard, as illustrated, the default operating condition data 502 remains at a consistent data value representing a feed rate (e.g., as illustrated along the vertical axis of the graphical depiction in FIG. 5) over each data value representing a particular timestamp within a particular timestamp interval (e.g., as illustrated along the lower, horizontal axis of the graphical depiction in FIG. 5). In this regard, the default operating condition data 502 remains at the same feed rate at each timestamp within the particular timestamp interval, and/or during each sub-interval thereof, resulting in default optimization data 500 that remains consistent across such timestamp intervals.

In various contexts, for example where the operational mode is not intended to remain consistent across one or more timestamp intervals, the default optimization data 500 thus represents inaccurate data. Accordingly, embodiments of the present disclosure utilize operating condition data for each of one or more operational mode(s) to generate corrective responses that offset the default operating condition data and corresponding default optimization data. In this regard, such embodiments provide for the ability to optimize operation of a particular processing unit with a multi-modal mode schedule without violating the default assumptions of an associated underlying architecture or other control scheme controlling the processing unit (e.g., an MPC architecture). Visualizations of the component data portion(s) of data and corresponding process for generation of the corrective responses are further described herein.

Figure 6:
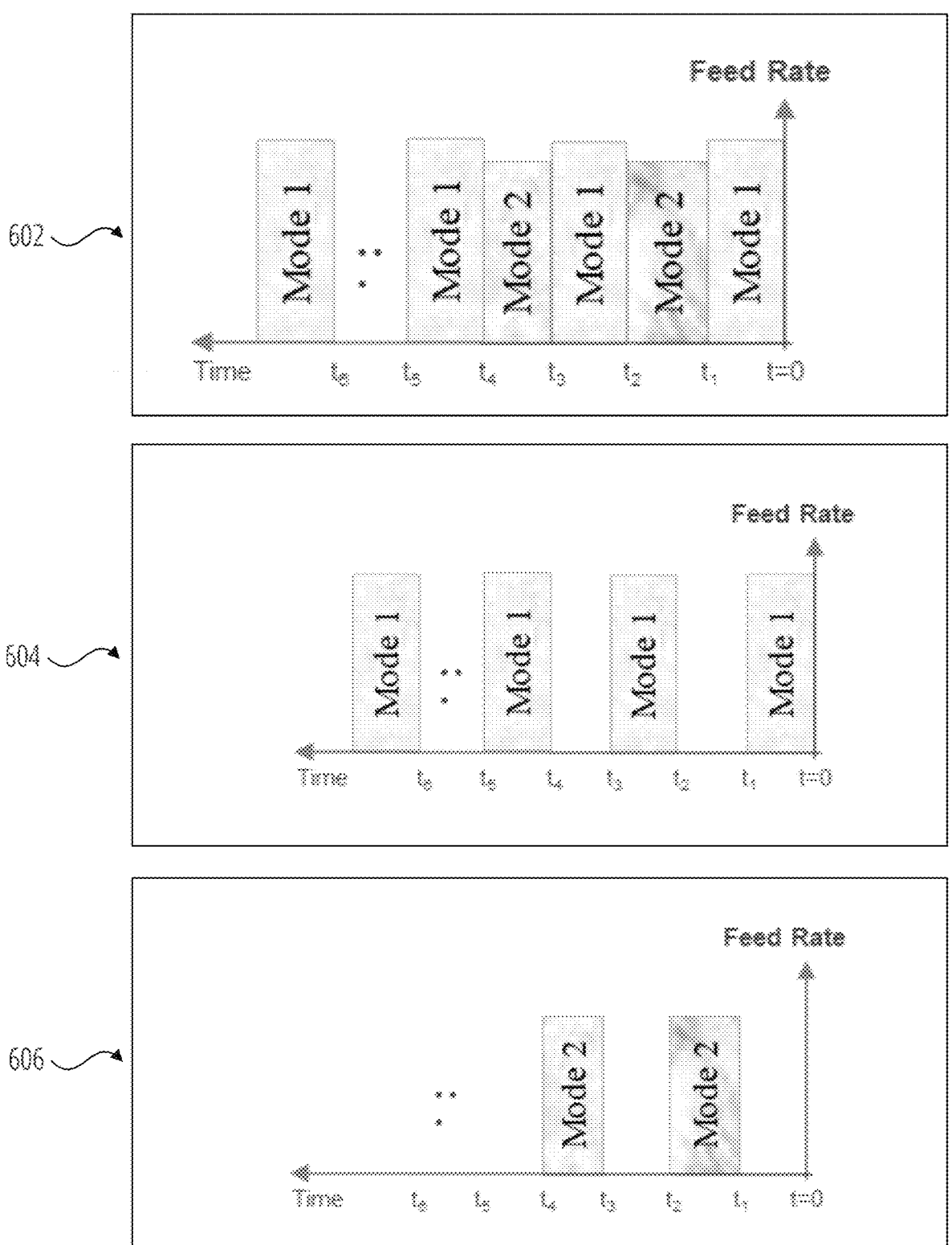
FIG. 6 illustrates visualizations of operating condition data corresponding to a plurality of operational modes for a particular mode schedule.

FIG. 6 illustrates visualizations of operating condition data corresponding to a plurality of operational modes for a particular mode schedule. Specifically, FIG. 6 depicts mode schedule 602 and corresponding operating condition data 604 and second operational mode operating condition data portions 606. The first operational mode operating condition data portions 604 embodies a first component of the mode schedule 602 corresponding to a first operational mode (operational mode 1), and second operational mode operating condition data portions 606 embodies a second component of the mode schedule 602.

In some embodiments, the first operational mode operating condition data portions 604 includes each portion of operating condition data corresponding to a first operational mode and associated with a particular timestamp interval during which the first operational mode is to be set. For example, as illustrated, the first operational mode operating condition data portions 604 includes a data portion corresponding to timestamp interval t0 to t1, a second data portion corresponding to timestamp interval t2 to t3, a third data portion corresponding to timestamp interval t4 to t5, and a fourth data portion corresponding to timestamp interval t6 to t(n) (e.g., a final timestamp interval). Such data portions embody each data portion corresponding to the first operational mode of the mode schedule 602. Further as illustrated, the second operational mode operating condition data portions 606 includes a data portion corresponding to timestamp interval t1 to t2, and a second data portion corresponding to timestamp interval t3 to t4. Such data portions embody each data portion corresponding to the second operational mode of the mode schedule 602.

It will be appreciated that the mode schedule 602 may be derived based at least in part on default operating condition data and the components embodied by the first operational mode operating condition data portions 604 and second operational mode operating condition data portions 606. For example, the mode schedule 602 may be derived by removing all data portions associated with a first operational mode that are not represented in the first operational mode operating condition data portions 604, and adding all remaining data portions associated with other operational modes (e.g., represented in the second operational mode operating condition data portions 606). In some embodiments, the apparatus 200 performs such derivations during an improved optimization process associated with a particular multi-modal processing unit. Non-limiting examples of such derivations are further described herein with respect to FIGS. 7 through 10.

Figure 7:
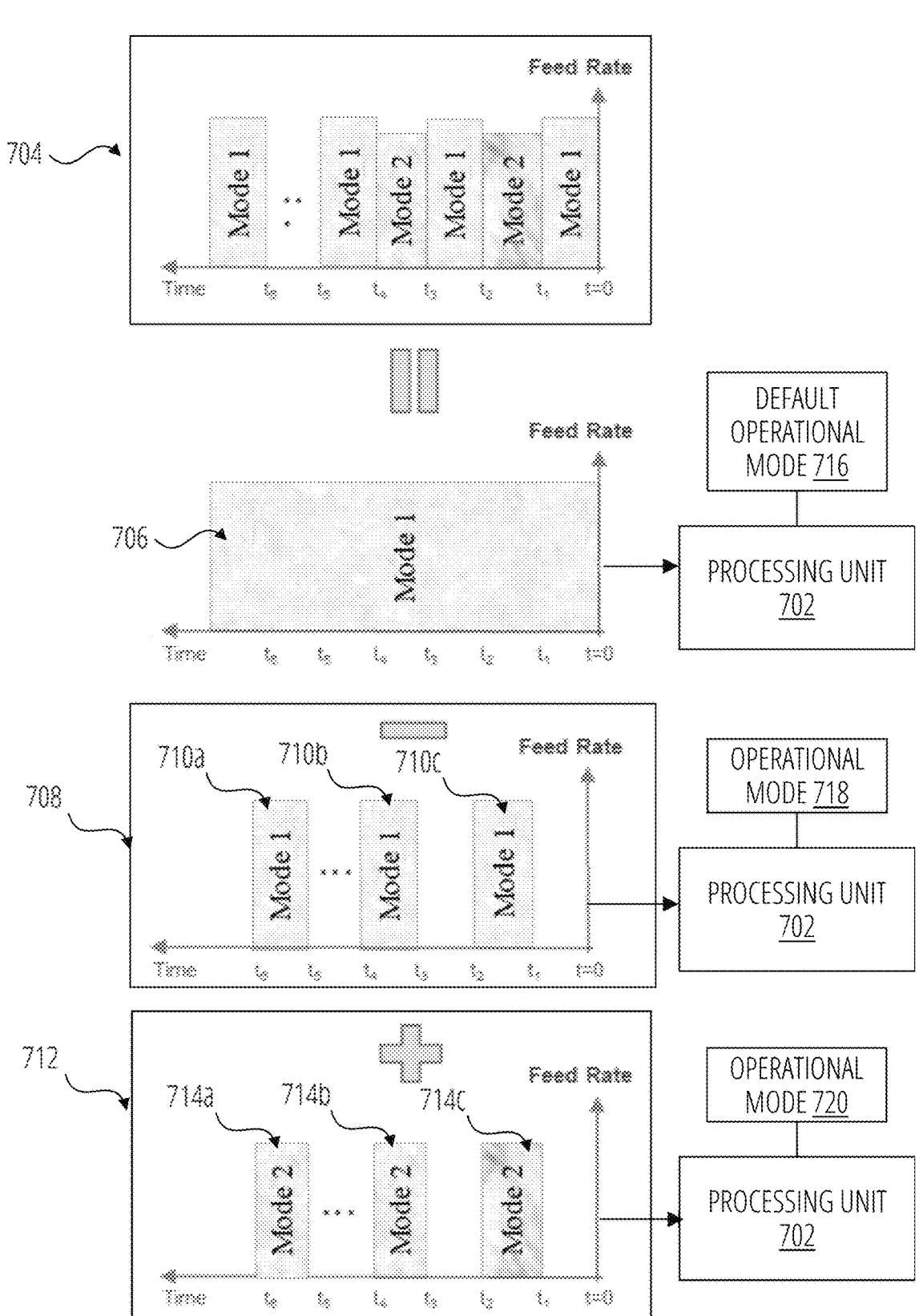
FIG. 7 illustrates visualizations of creating adjusted operating condition data corresponding to a particular mode schedule from a combination operating condition data for a plurality of operational modes.

FIG. 7 illustrates visualizations of creating adjusted operating condition data corresponding to a particular mode schedule from a combination operating condition data for a plurality of operational modes. Specifically, FIG. 7 illustrates generation of adjusted operating condition data representing the mode schedule 704 based at least in part on default operating condition data 706, particular first operating condition data 708, and particular second operating condition data 712. The adjusted operating condition data representing the mode schedule 704 is generated associated with operation of a particular processing unit, for example the processing unit 702. In this regard, the corresponding operating condition data associated with the processing unit 702 may be generated based at least in part on a particular operational mode set for the processing unit 702.

For example, as illustrated, the default operating condition data 706 in some embodiments is generated for a default operational mode 716 associated with the processing unit 702. The default operational mode 716 in some embodiments corresponds to a current operational mode set for the processing unit 702 at the time that an optimization process is initiated. In some such embodiments, the default operating condition data 706 represents such operating condition data derived based at least in part on the default operational mode 716 and based at least in part on a default assumption associated with the processing unit 702, for example an assumption associated with the dynamic control scheme (e.g., an MPC architecture) utilized to control the processing unit 702 that the default operational mode 716 remains set for a complete timestamp interval during which optimization data is to be generated.

FIG. 7 specifically depicts the particular combinations of the components utilized to derive the adjusted operating condition data representing the mode schedule 704 from the default operating condition data 706. For example, in some embodiments, the apparatus 200 generates the first operating condition data 708 corresponding to a first operational mode 718, where the first operating condition data 708 includes data portion(s) of operating condition data corresponding to time intervals where the first operational mode 718 is not active as represented in the adjusted operating condition data representing the mode schedule 704. For example, as illustrated, the first operating condition data 708 includes first operating condition data portion 710*a*, first operating condition data portion 710*b*, and first operating condition data portion 710*c*, corresponding to timestamp intervals t5 to t6, t3 to t4, and t1 to t2 respectively. In some embodiments, the apparatus 200 receives and/or generates the adjusted operating condition data representing the mode schedule 704, and identifies the first operating condition data 708 associated with the first operational mode 718 by determining the timestamp interval(s) of the adjusted operating condition data representing the mode schedule 704 where the first operational mode 718 is not active.

In some embodiments, the apparatus 200 generates intermediary operating condition data based at least in part on the default operating condition data 706 and first operating condition data 708. For example, in some embodiments, the apparatus 200 generates intermediary operating condition data by removing the first operating condition data 708 from the default operating condition data 706. For example, in some embodiments, the first operating condition data 708 is removed from the default operating condition data 706 by subtracting each of the data portions 710a, 710b, and 710c from the default operating condition data 706. In this regard, the intermediary operating condition data in some embodiments represents the default operating condition data with the only remaining data portions being the portions of operating condition data where the operational mode represented by the default operational mode 716 (e.g., the first operational mode 718) is to be represented in the adjusted operating condition data representing the mode schedule 704. The first operating condition data 708 in such a context is removed from the default operating condition data 706 to zero-out portions where the first operational mode is not active (e.g., another operational mode is active, or no operational mode is active at all), such that the carved out portions of the default operating condition data leaves the portions of the adjusted operating condition data representing the mode schedule 704 corresponding to a default operational mode (e.g., mode 1 as depicted).

Additionally or alternatively, in some embodiments, the apparatus 200 generates the second operating condition data 712 corresponding to a second operational mode 720, where the second operating condition data 712 includes data portion(s) of operating condition data corresponding to time intervals where the second operational mode 720 is active as represented in the adjusted operating condition data representing the mode schedule 704. For example, as illustrated, the second operating condition data 712 includes second operating condition data portion 714a, second operating condition data portion 714b, and second operating condition data portion 714c, corresponding to the same timestamp intervals t5 to t6, t3 to t4, and t1 to t2 respectively. In some embodiments, the apparatus 200 receives and/or generates the adjusted operating condition data representing the mode schedule 704, and identifies the second operating condition data 712 associated with the operational mode 720 by determining the timestamp interval(s) of the adjusted operating condition data representing the mode schedule 704 where the operational mode 720 is active.

In some embodiments, the apparatus 200 updates the intermediary operating condition data based at least in part on the second operating condition data 712. For example, having removed the portions of the adjusted operating condition data representing the mode schedule 704 where the default operational mode 716 is not active (e.g., utilizing the first operating condition data 708), the intermediary operating condition data may be updated by including the second operating condition data 712 to the intermediary operating condition data. In some such embodiments, the intermediary operating condition data is updated by adding the second operating condition data 712 to the intermediary operating condition data. In this regard, the updated intermediary operating condition data represents adjusted operating condition data, where the second operating condition data portion 714a, second operating condition data portion 714b, and second operating condition data portion 714c are included at the timestamp intervals where the operational mode 720 is to be represented in the adjusted operating condition data representing the mode schedule 704. Accordingly, as the adjusted operating condition data representing the mode schedule 704 includes only two operational modes, the updated intermediary operating condition data embodies the adjusted operating condition data representing the mode schedule 704.

It should be appreciated that in other embodiments, operating condition data associated with one or more additional operational modes may similarly be included in the intermediary operating condition data to generate the adjusted operating condition data. In this regard, the apparatus 200 may remove the first operating condition data 708 to zero-out or otherwise neutralize all portions in intermediary operating condition data where the default operational mode is not represented in the corresponding mode schedule for a particular processing unit. Subsequently, the apparatus 200 may update the intermediary operating condition data with the operating condition data for each other operational mode represented in the mode schedule in the manner depicted and described with respect to the inclusion of the second operating condition data 712.

Figure 8:
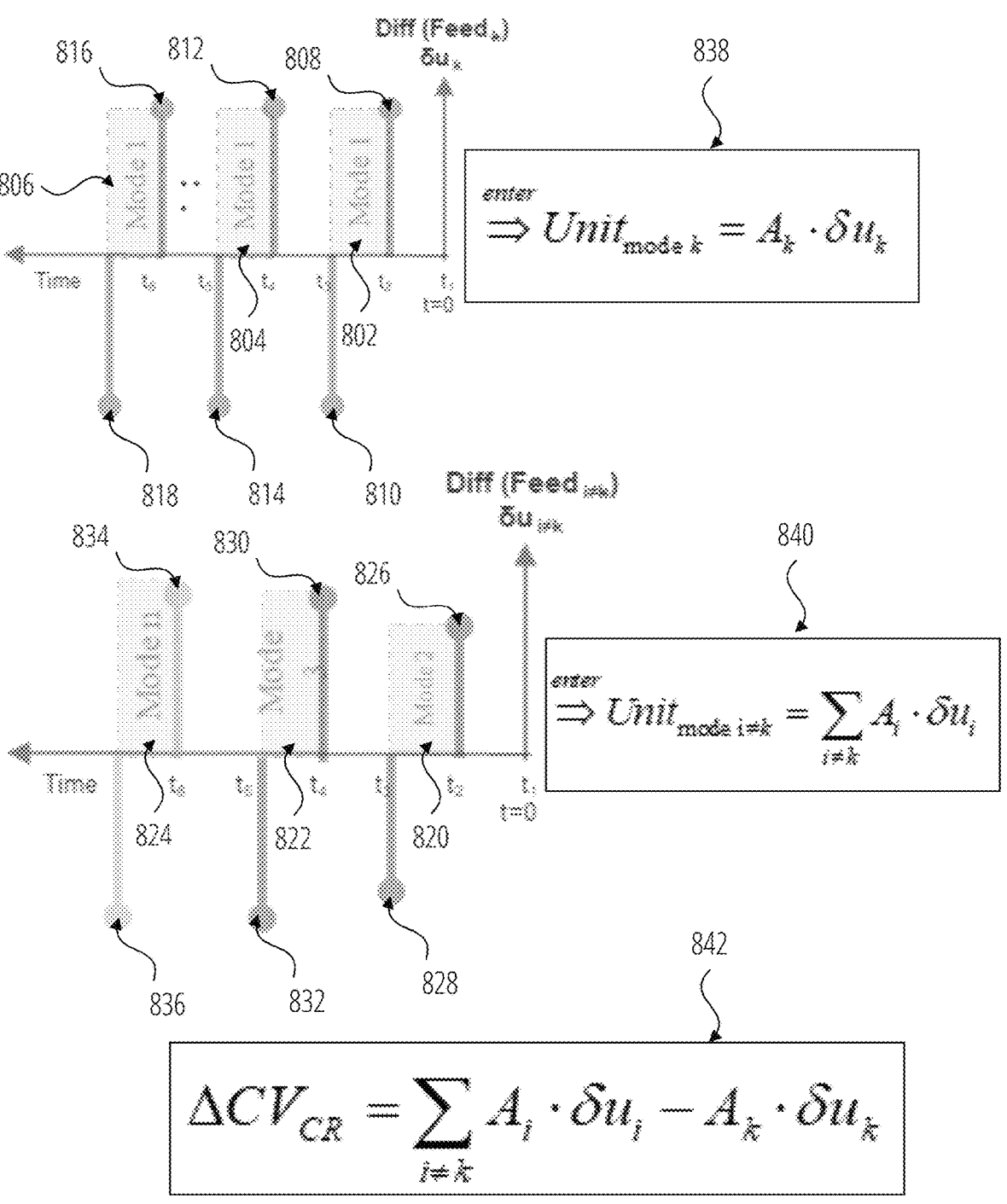
FIG. 8 illustrates visualizations of input pulses corresponding to a plurality of different operational modes in accordance with at least one example embodiment of the present disclosure.

In some embodiments, the apparatus 200 is configured to identify a data portion of operating condition data in any of a myriad of manners. For example, in some embodiments, the apparatus 200 identifies particular operating condition data for a particular operational mode based at least in part on processing of one or more input pulse(s) associated with a particular operational mode. FIG. 8 illustrates visualizations of input pulses corresponding to a plurality of different operational modes in accordance with at least one example embodiment of the present disclosure. FIG. 8 further indicates formulas that represent data values for operating condition data utilized to determine corrective response value(s) utilized to generate adjusted optimization data as depicted and described herein. In this regard, the corrective response values corresponding to the particular operating condition data may be utilized to update default optimization data (e.g., generated based at least in part on a default assumption, for example associated with control via a particular control scheme, for example an MPC architecture) and generate corresponding adjusted optimization data, where the adjusted optimization data represents an accurate optimization accounting for multi-modal operation of a particular processing unit or plurality of processing units.

FIG. 8 particularly depicts input pulses corresponding to data of particular operational modes of a mode schedule. Specifically, the input pulses correspond to particular operating condition data for such operational modes. In some embodiments, the operating condition data represents particular data portions extracted from a particular inputted mode schedule, for example where the data portions for each operational mode are extracted from the inputted mode schedule as described herein. FIG. 8 further depicts the data portions extracted from a mode schedule that embody the starting points from which input pulses corresponding to particular operational modes are derivable.

As illustrated, FIG. 8 depicts various positive input pulses and negative input pulses, with a series of positive input pulse and then negative input pulse defining a portion of operating condition data. For example, as illustrated, a first mode operating condition data portion 802 is defined by a first input pulse 808 and a second input pulse 810. In some such embodiments, the input pulse 808 represents a first data value that defines a beginning of the first mode operating condition data portion 802. The input pulse 808 is associated with a timestamp t2, where the first mode operating condition data portion 802 begins. As illustrated, the input pulse 808 represents a positive value, for example indicating a change from no input signal to an input signal of a particular value representing the differential of the feed rate associated with the corresponding processing unit. Similarly, in some embodiments, the input pulse 810 represents a second data value that defines an end of the first mode operating condition data portion 802. The input pulse 810 is associated with a timestamp t3, where the first mode operating condition data portion 802 ends. In this regard, the first mode operating condition data portion 802 is defined by the timestamp interval between the input pulse 808 and the input pulse 810 (e.g., t2 to t3). As illustrated, the input pulse 810 represents a negative value, for example indicating a change from an input signal of a particular value corresponding to the feed rate back to no input signal.

In some embodiments, the apparatus 200 determines a pulse input value corresponding to a particular input pulse utilizing a pulse input model. In some embodiments, the pulse input model detect(s) and/or process(es) input signal(s) embodying the input pulse to determine the corresponding input pulse value based at least in part on the input signal(s). In some embodiments, the apparatus 200 maintains the pulse input model for use with such input signal(s) embodying an input pulse. In some embodiments, the pulse input model comprises a different operator formula that successively produces an output series of input pulse values (e.g., as a vector or the like) based on differences between a current value in a data series embodying a mode schedule and a previous value in the data series embodying the mode schedule.

The apparatus 200 in some embodiments processes any number of input pulse(s) to identify and/or generate various portion(s) of operating condition data for a particular operational mode. For example, as illustrated in FIG. 8, a second data portion embodying another first mode operating condition data portion 804 is defined by a first input pulse 812 and a second input pulse 814. The first mode operating condition data portion 804 is defined between two timestamps associated with the input pulses 812 and 814, specifically defining the timestamp interval t4 to t5. Additionally, a third data portion embodying yet another first mode operating condition data portion 806 is defined by a first input pulse 816 and a second input pulse 818. The first mode operating condition data portion 806 is defined between two timestamps associated with the input pulses 816 and 818, specifically defining the timestamp interval t6 to t(n). In this regard, it will be appreciated that the apparatus 200 may utilize input pulses to define any number of data portions of operating condition data associated with a particular operational mode.

In some embodiments, the operating condition data corresponding to a particular default operational mode (e.g., "mode 1" as depicted) is determinable based at least in part on the formula 838. In this regard, the operating condition data may be generated for a particular mode (k) corresponding to a default operational mode. In some embodiments, the default operational mode is determinable based at least in part on an assumption associated with optimization of a particular processing unit, for example a default assumption associated with optimization via a particular control scheme (e.g., an MPC architecture) that a currently active operational mode will remain active or otherwise set for a particular processing unit. The formula 838 is further based at least in part on a step response model matrix A. The subscript of the step response model matrix A represents a corresponding operational mode of a plurality of possible operational modes. In this regard, the step response model matrix may be dynamically generated or prebuilt and retrieved or otherwise maintained by the apparatus 200 for use with a particular operational mode. Based on the vector for the particular mode $u_k$, the corresponding operating condition data for the default operational mode may be generated utilizing the formula 838 for removal from corresponding default operating condition data (e.g., as depicted and described with respect to FIG. 7).

Similar input pulse processing methodologies and formula-based generation of operating condition data may be utilized for any number of other operational modes. For example, FIG. 8 further depicts a second graphical representation of operating condition data corresponding to a second, third, and fourth operational mode. It will be appreciated that a processing unit may be configured to perform one of any number of operational modes, for example represented by operational mode n.

The second graphical representation in FIG. 8 depicts a second mode operating condition data portion 820, which corresponds to a second operational mode that may be activated for a particular processing unit (or plurality of processing units, for example defining a processing plant). The second mode operating condition data portion 820 is defined by a first input pulse 826 and a second input pulse 828. In this regard, the second mode operating condition data portion 820 is defined between two timestamps associated with the input pulses 826 and 828, specifically defining the timestamp interval t2 to t3. Additionally, the second graphical representation depicts a third mode operating condition data portion 822. The third mode operating condition data portion 822 is defined by a first input pulse 830 and a second input pulse 832. In this regard, the third mode operating condition data portion 822 is defined between two timestamps associated with the input pulses 830 and 832, specifically defining the timestamp interval t4 to t5. Additionally still, the second graphical representation depicts a fourth mode operating condition data portion 824. The fourth mode operating condition data portion 824 is defined by a first input pulse 834 and second input pulse 836. In this regard, the fourth mode operating condition data portion 824 is defined between two timestamps associated with the input pulses 834 and 836, specifically defining the timestamp interval t6 to t (n).

Each of the operating condition data corresponding to each of the second, third, and fourth operational modes (and/or any other additional operational modes that differ from the default operational mode) may be similarly identified based at least in part on the corresponding input pulses. It will be appreciated that, as depicted, the different operational modes may correspond to different input pulse values, for example where operational mode 2 is associated with a lower input pulse value than operational mode 3, as depicted, which are both similarly of a lower input pulse value than operational mode n. In some such embodiments, different operational modes are defined based at least in part on differing input pulse values corresponding to operating condition data associated with such operational modes.

In some embodiments, the operating condition data corresponding to each other operational mode is determinable based at least in part on the formula 840. In this regard, the operating condition data may be generated for each additional, non-default mode i, where i does not equal k (the default operational mode). The formula 840 is similarly based on the step response model matrix A, with the subscript of the step response model matrix A representing the corresponding operational mode of a plurality of possible operational modes. In this regard, the step response model matrix may be dynamically generated (e.g., at build time) or prebuilt and retrieved or otherwise maintained by the apparatus 200 for use with a particular operational mode. Based on the vector for the particular mode $u_i$, where i does not equal k, the corresponding operating condition data for the other operational modes of a mode schedule may be generated utilizing the formula 840. Such operating condition data may be included to intermediary operating condition data, for example generated by removing the operating condition data described with respect to the first operational mode (embodying a default operational mode in this example as described) with respect to the formula 838.

It will be appreciated that the individual formulas 838 and 840 may be combined to form a single formula for representing the corrective responses for a multi-modal context. For example, the removal of the operating condition data represented with respect to formula 838 may be represented by subtraction of such operating condition data, and including of the operating condition data represented with respect to formula 840 may be represented by addition of such operating condition data. In this regard, the combined corrective response values may be represented by the corrective value formula 842, which represents a combination of the formula 838 and formula 840. Accordingly, in some embodiments, the apparatus 200 applies the corrective value formula 842 in place of the individual sub-formulas 838 and 840.

In one example context, the mode schedule 400 is utilized to generate a schedule of pulse input(s), for example as depicted and described herein with respect to FIG. 8. In some embodiments, the apparatus 200 generates the pulse inputs by applying a difference operator on the data portions of the mode schedule 400. In one example context, for example a discretized system, the mode schedule 400 may be represented by a vector or other series of numerical values, where their position in the series represents the discretized timestamp of the portion of the schedule. The difference operator in some embodiments embodies a mathematical formula, operation, or other process that takes a current value of an input signal series (e.g., the vector representing the mode schedule 400) minus a previous value in the input signal series. In this regard, the application of such difference operators enables derivation of the input pulse(s) of FIG. 8 from a particular corresponding mode schedule, for example the mode schedule 400 as depicted and described with respect to FIG. 4. The schedule of input pulses then defines a particular input vector, one or more of $\delta u$, $\delta s$ or $\delta \Delta u$, for example as utilized in one or more of the equation formulas described herein.

Figure 9:
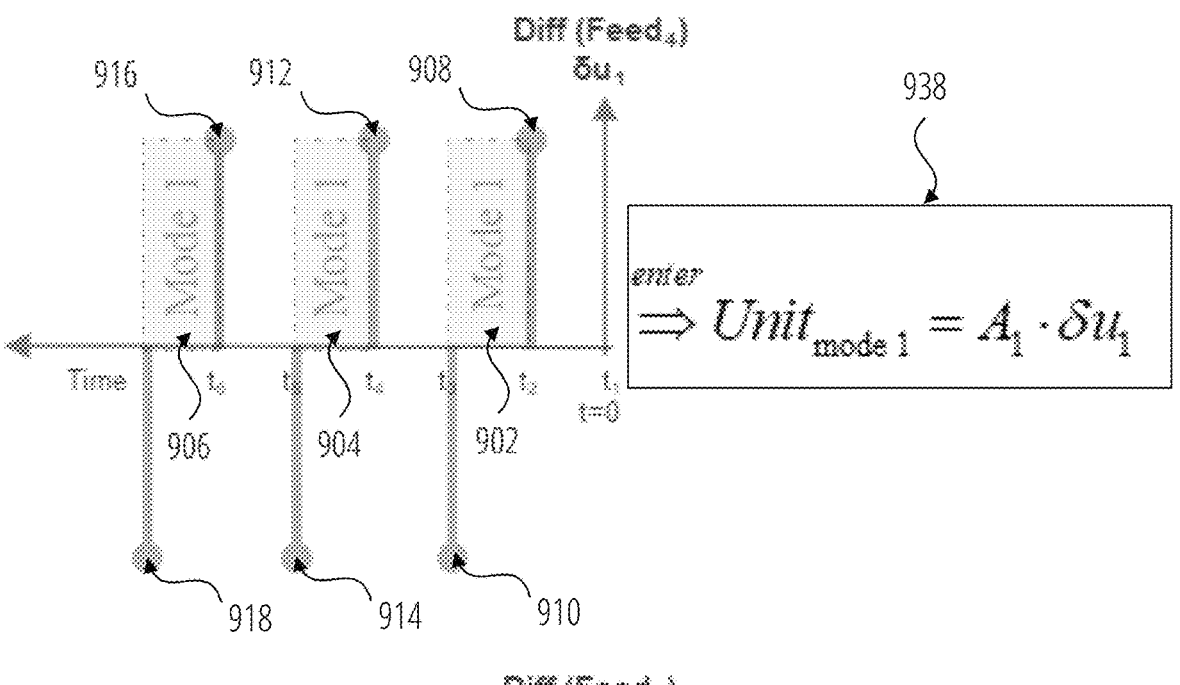
FIG. 9 illustrates visualizations of input pulses corresponding to dual operational modes in accordance with at least one example embodiment of the present disclosure.
Figure 9:
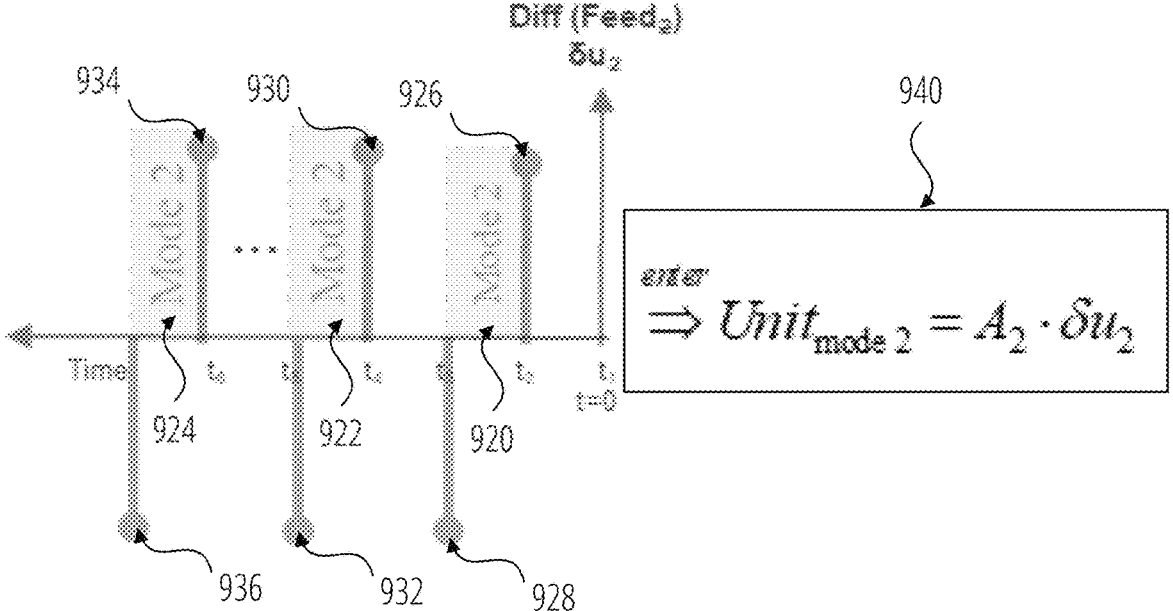

FIG. 9 illustrates visualizations of input pulses corresponding to dual operational modes in accordance with at least one example embodiment of the present disclosure. Specifically, FIG. 9 further indicates formulas that represent data value for operating condition data utilized to determined corrective response value(s) in the context of a dual-mode optimization (e.g., for a mode schedule only including a first operational mode and a second operational mode).

As illustrated, FIG. 9 similarly depicts various positive input pulses and negative input pulses, with a series of a positive input pulse and then a negative input pulse defining a portion of operating condition data. For example, FIG. 9 depicts a first graphical representation including a first mode operating condition data portion 902 defined by a first input pulse 908 and a second input pulse 910, a first mode operating condition data portion 904 defined by a first input pulse 912 and a second input pulse 914, and a first mode operating condition data portion 906 defined by a first input pulse 916 and a second input pulse 918. In this regard, the first mode operating condition data portion 902 is defined between the timestamp interval t2 to t3, the first mode operating condition data portion 904 is defined between the timestamp interval t4 to t5, and the first mode operating condition data portion 906 is defined between the timestamp interval t6 to t(n). Each of the portions of operating condition data 904, 906, and 908 correspond to a first operational mode, for example embodying a default operational mode based at least in part on a default assumption.

The operating condition data corresponding to the first operational mode is determinable based at least in part on the formula 938. As illustrated, the formula 938 embodies a simplified version of the formula 838 in the context of processing dual operational modes. As illustrated, the formula 938 is based at least in part on the step response model matrix $A_1$ that corresponds to the first operational mode. The step response model matrix corresponding to the first operational mode may be dynamically generated or prebuilt and retrieved or otherwise maintained by the apparatus 200 for use with the first operational mode. Based at least in part on the vector for the first operational mode $u_1$, the corresponding operating condition data for the first operational mode may be generated utilizing the formula 938. The resulting operating condition data may be removed from corresponding default operating condition data (e.g., as depicted and described with respect to FIG. 7), for example to generate intermediary operating condition data.

FIG. 9 further depicts a second graphical representation of operating condition data corresponding to a second operational mode. In this regard, the second graphical representation include a plurality of data portions of operating condition data corresponding to the second operational mode, specifically second mode operating condition data portion 920, second mode operating condition data portion 922, and second mode operating condition data portion 924. The second mode operating condition data portion 920 is defined by a first input pulse 926 and second input pulse 928. In this regard, the second mode operating condition data portion 920 is defined between two timestamps associated with the first input pulse 926 and second input pulse 928, specifically defining the timestamp interval t2 to t3. Additionally, the second graphical representation depicts a second mode operating condition data portion 922 defined by a first input pulse 930 and a second input pulse 932. In this regard, the second mode operating condition data portion 922 is defined between two timestamps associated with the first input pulse 930 and the second input pulse 932, specifically defining the timestamp interval t4 to t5. Additionally, the second graphical representation depicts a second mode operating condition data portion 924 defined by a first input pulse 934 and a second input pulse 936. In this regard, the second mode operating condition data portion 924 is defined between two timestamps associated with the first input pulse 934 and the second input pulse 936. Each of the portions of operating condition data 920, 922, and 924 correspond to a second operational mode, for example that differs from a default operational mode.

The operating condition data corresponding to the second operational mode is determinable based at least in part on the formula 940. As illustrated, the formula 940 embodies a simplified version of the formula 840, specifically in the context where the additional operational modes associated with multi-modal operation of a processing unit includes only a second operational mode. As illustrated, the formula 940 is based at least in part on the step response model matrix $A_2$ that corresponds to the second operational mode. The step response model matrix corresponding to the second operational mode may be dynamically generated or prebuilt and retrieved or otherwise maintained by the apparatus 200 for use with the second operational mode. Based at least in part on the vector for the second operational mode $u_2$, the corresponding operating condition data for the second operational mode may be generated utilizing the formula 940. The resulting operating condition data may be included in intermediary operating condition data generated by removing the first mode operating condition data from default operating data (e.g., as depicted and described with respect to FIG. 7). In this regard, as illustrated it will be appreciated that the timestamp intervals of the first mode operational condition data portions that were removed overlaps with the timestamp intervals of the second mode operational condition data portions that were included, such that the generated adjusted operating condition data resulting from the removal and inclusion of such data replaces the portions of data at such timestamp intervals with the second mode operating condition data instead of including the default operating condition data values at such timestamp intervals.

It will be appreciated that the individual formulas 938 and 940 may be combined to derive a single formula for representing the corrective responses for a dual-modal context. For example, the removal of the operating condition data represented with respect to formula 938 may be represented by subtraction of such operating condition data, and including of the operating condition data with respect to formula 940 may be represented by addition of such operating condition data. In this regard, the combined corrective response values may be represented by the corrective value formula 942, which represents a combination of the formula 938 and the formula 940. In the corrective value formula 942, the term $R_s$ is equivalent to $\text{mag}(u_i)^*A_i$, which embodies a step response model matrix that may be prebuilt, dynamically generated at build time, and/or the like. Additionally, in the corrective value formula 942, the term δs is equivalent to the unit height of the switching signal (e.g., embodying an input pulse as depicted and described with respect to the graphical representations in FIG. 9, for example). In this regard, the corrective value formula 942 provides various advantages, including that in some embodiments only the vector δs needs to be shifted forward in tandem with the plant-wide optimization execution (e.g., of a particular optimization process), and/or that the δs can be updated independently when $u_1$ and/or $u_2$ switching timing is updated.

Figure 10:
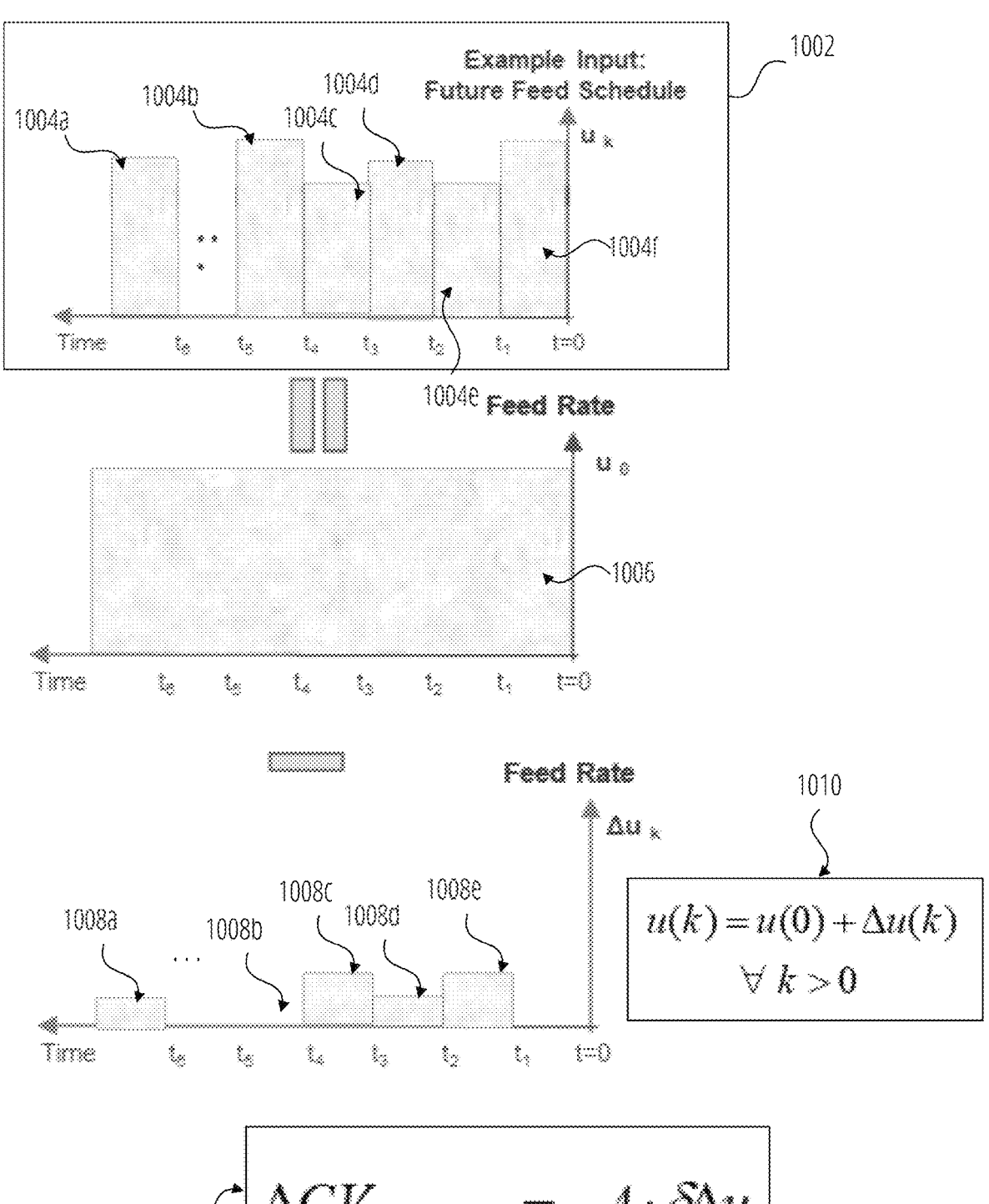
FIG. 10 illustrates visualizations of simplified formulas for generating adjusted optimization data from a combination of operating condition data corresponding to time-varying future schedules in accordance with at least one example embodiment of the present disclosure.

FIG. 10 illustrates visualizations of simplified formulas for generating adjusted optimization data from a combination of operating condition data corresponding to time-varying future schedules in accordance with at least one example embodiment of the present disclosure. In this regard, the time-varying future schedule may adjust the future feed rate schedule of a particular processing unit to a different amount during different timestamp intervals of operation. The future feed rate associated with a particular timestamp interval may vary for any of a myriad of reasons. For example, in some contexts, a future feed rate may change based at least in part on a planned or unplanned shutdown and/or subsequent startup of a processing unit, disruption in operation of the processing unit, optimization to maximize output of the processing unit during particular time intervals (e.g., when electricity or other resources required to operate the processing unit are obtainable with a reduced cost), and/or the like.

In some embodiments, the various time-varying future schedules correspond to different portions of operating condition data, for example representing different values. In this regard, the various different schedules may be treated akin to different operational modes, for example with the time-varying future schedules embodying a mode schedule with each varying feed rate (or other value for operating condition data for example) representing different target operating condition data for a different timestamp interval in a manner similar to different operational modes as depicted and described herein. For example, as illustrated, the mode schedule 1002 includes a plurality of target operating condition data portions associated with different timestamp intervals. The mode schedule 1002 begins with a first target operating condition data portion 1004f defined between timestamp interval t0 (a current time) to t1 (a subsequent timestep). Subsequently the mode schedule 1002 includes second target operating condition data portion 1004e between timestamp interval t1 and t2, third target operating condition data portion 1004d between timestamp interval t2 and t3, fourth target operating condition data portion 1004c between timestamp interval t3 to t4, fifth target operating condition data portion 1004b between timestamp interval t5 to t6, and a sixth target operating condition data portion 1004a between timestamp interval t6 to t(n).

As illustrated, the apparatus 200 may generate default operating condition data. For example, as illustrated, FIG. 10 depicts default operating condition data 1006. The default operating condition data 1006 relies on a default assumption associated with operation of the processing unit, for example based at least in part on a default assumption associated with the particular dynamic control scheme (e.g., an MPC architecture) of the processing unit, that the current operation of the processing unit will remain fixed. In this regard, the scheduled feed rate represented by target operating condition data portion 1004f (e.g., which begins at t0 embodying a current timestamp) is assumed to continue for the entirety of the timestamp interval ranging from t0 to t6. In this regard, the current feed rate may be treated as the default operational mode for purposes of processing multiple time-varying schedules of the feed rate with respect to the subsequent timestamp intervals.

As illustrated in the second graphical representation of FIG. 10, in some embodiments the apparatus 200 determines incremental corrections for future CVs. In this regard, the incremental corrections represent particular offsets from the default operating data to be removed from the default operating data to generate adjusted operating condition data representing the mode schedule 1002. Specifically, the incremental corrections are determined to include the incremental operating condition data 1008e, the incremental operating condition data 1008d, the incremental operating condition data 1008c, the incremental operating condition data 1008b, and the incremental operating condition data 1008a. It will be appreciated that the incremental operating condition data for some such timestamp intervals may represent a zero value, for example where the future feed rate is scheduled to be the same as the default operating condition data based on the default assumption (e.g., as depicted with respect to incremental operating condition data 1008b), or a negative value, for example where the feed rate is scheduled to be greater than the default operating condition data.

In some embodiments, the apparatus 200 is configured to generate the incremental operating condition data corresponding to the future scheduled feed rates based at least in part on the formula 1010. In this regard, the default operating condition data may correspond to a first feed rate considered as a default operational mode based on a default assumption, for example represented by k equal to 0. In this regard, the incremental operating condition data may be removed from the default operating condition data to generate the corresponding adjusted operating condition data without requiring subsequent processing of any intermediary operating condition data.

Based at least in part on the prior formulas depicted and described herein, the formula 1010 may be utilized to further simplify a corrective response formula in contexts with a varying future feed schedule. Specifically, the corrective value formula 1012 may be derived based at least in part on the formula 1010. In this regard, the corrective value formula 1012 is further based at least in part on a step response model matrix A for the single operational mode together with δΔu representing the timestep changes in the vector between timestamp intervals.

It should be appreciated that the formulas corrective value formula 1012, corrective value formula 942, and/or corrective value formula 842 may be utilize to generate corrective response values based on different operational modes, or conditions considered equivalent to such different operational modes, that may be utilized to correct default assumptions associated with optimization of operation of a processing unit. In this regard, the corrective response values generated via such formulas may embody adjusted operating condition data utilized to adjust default optimization data by a particular corrective offset in accordance with the represented corrective response values. In this regard, the corrective response values represented in the adjusted operating condition data may be combined with the default optimization data to generate adjusted optimization data that is accurate for multi-modal operation of a particular processing unit. In this regard, the adjusted optimization data may subsequently be processed, output, and/or otherwise utilized for plant-wide optimization of a multi=modal processing unit.

Example Processes of the Disclosure

Having described example systems and apparatuses, data visualizations, and formulas in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depicts a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 11 illustrates a flowchart including operations of an example process for improved multi-modal optimization in accordance with at least one example embodiment of the present disclosure. Specifically, FIG. 11 depicts an example process 1100. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the apparatus 200 alone or in communication with one or more other component(s), device(s), system(s), and/or or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate component(s) of a network, external network(s), and/or the like, to perform one or more of the operation(s) as depicted and described. For purposes of simplifying the description, the process 1100 is described as performed by and from the perspective of the apparatus 200.

Although the example process 1100 depicts a particular sequence of operations, the sequence may be altered without departing from the scope of the present disclosure. For example, some of the operations depicted may be performed in parallel or in a different sequence that does not materially affect the function of the process 1100. In other examples, different components of an example device or system that implements the process 1100 may perform functions at substantially the same time or in a specific sequence.

In some embodiments, the method includes receiving a mode schedule. The apparatus 200 in some embodiments receives a mode schedule in response to user engagement embodying input of the node schedule. Additionally or alternatively, in some embodiments, the apparatus 200 receives an upload or other indication of a file, data object(s), and/or the like embodying the mode schedule. Additionally or alternatively, in some embodiments, the apparatus 200 determines and/or retrieves the mode schedule automatically, for example at automated timestamps, in response to data-driven determination(s), and/or the like. In some embodiments, the apparatus 200 processes the mode schedule to identify one or more particular portions of operating condition data as described herein.

According to some examples, the method includes generating default operating condition data associated with a first timestamp interval at operation 1102. In some embodiments, the apparatus 200 generates the default operating condition data based at least in part on a default assumption associated with a processing unit. For example, in some embodiments, the apparatus 200 generates the default operating condition data representing a continuation of a current operational mode associated with the processing unit. In a context where a processing unit is currently set to a first operational mode and configurable to set one of 3 possible modes, for example, the default operating condition data represents a continuation of the first operational mode over a particular timestamp interval. In some embodiments, the default operating condition data represents a particular first value associated with the first operational mode for the entirety of the particular timestamp interval. For example, in some embodiments, the apparatus 200 receives, retrieves, or otherwise identifies a mode schedule defined across a particular timestamp interval, such that the default operating condition data is generated associated with the particular timestamp interval of the mode schedule.

According to some examples, the method includes identifying first operating condition data associated with a second timestamp interval at operation 1104. In some such embodiments, the second timestamp interval comprises at least one subinterval of the first timestamp interval. In some embodiments, the first operating condition data corresponds to the same operational mode as the default operating condition data. In this regard, the apparatus 200 may identify first operating condition data of the first value at one or more subintervals of the first timestamp interval. In some embodiments, the apparatus 200 identifies the second timestamp interval including particular subinterval(s) of the first timestamp interval for which the first operational mode (e.g., identified as the default operational mode) where the first operational mode is not to be active from a mode schedule.

According to some examples, the method includes generating intermediary operating condition data based at least in part on the first operating condition and the default operating condition data at operation 1106. In some embodiments, the apparatus 200 generates the intermediary operating condition data by at least subtracting the first operating condition data from the default operating condition data. In this regard, the removing of the first operating condition data from the default operating condition data may negate or otherwise zero-out the value(s) of the intermediary operating condition data at the second timestamp interval representing the subinterval of the first timestamp interval. In some embodiments, the second timestamp interval includes a plurality of sub-intervals, for example each timestamp interval during which the first operational mode corresponding to the default operating condition data is determined not to be active.

According to some examples, the method includes identifying second operating condition data associated with a third timestamp interval at operation 1108. In some embodiments, the second operating condition data represents a second value associated with a second operational mode of the processing unit. In some embodiments, the third timestamp interval comprises at least one subinterval of the second timestamp interval. In this regard, the third timestamp interval may represent particular timestamp intervals where the second operational mode is to be active in accordance with a particular mode schedule. As the first operational mode associated with the default operating condition data is not to be active at such a timestamp interval, the second operating condition data thus may correspond to particular subinterval(s) of the second timestamp interval that was/were zeroed-out in the intermediary operating condition data, for example as depicted and described with respect to operation 1106.

According to some examples, the method includes generating adjusted operating condition data at operation 1110. In some embodiments, the apparatus 200 generates the adjusted operating condition data by at least adding the second operating condition data to the intermediary operating condition data. In this regard, the addition of the second operating condition to the intermediary operating condition data positions the second operating condition data for the second operational mode at proper timestamp interval(s) during which the second operational mode is to be active as determinable based at least in part on a mode schedule. In some embodiments, the third timestamp interval includes a plurality of sub-intervals, for example each timestamp interval during which the second operational mode corresponding to the second operating condition data is determined to be active.

In some embodiments, the apparatus 200 identifies additional operating condition data for a plurality of operational modes. For example, in some embodiments the at least one additional operating condition data associated with different subintervals of the second timestamp interval. In this regard, the additional operating condition data may be identified corresponding to each additional operational mode represented in a mode schedule. Such additional operating condition data may be added to the intermediary operating condition data to represent such data at particular timestamp intervals that were zeroed-out.

In some embodiments, the apparatus 200 determines a particular portion of operating condition data based at least in part on one or more input pulse(s), as described herein. For example, in some embodiments, a portion of operating condition data for a particular operational mode is defined between a first input pulse associated with a first value and a second input pulse, for example where the first input pulse is a positive input pulse and the second input pulse is a negative input pulse. In some embodiments, the apparatus 200 utilizes a pulse input model to determine pulse input value(s) defining the operating condition data. For example, in some embodiments, the apparatus 200 detects each input pulse and/or associated input pulse value, such as utilizing a pulse input model.

Additionally or alternatively, in some embodiments, the apparatus 200 identifies and/or retrieves a step response model matrix associated with a particular operational mode, wherein the operating condition data corresponding to the operational mode is generated based at least in part on the step response model matrix. In some embodiments, the step response model matrix is prebuilt and/or otherwise retrievable via the apparatus 200. Additionally or alternatively, in some embodiments, the step response model matrix generates the step response model matrix.

According to some examples, the method includes generating adjusted optimization data based at least in part on the adjusted operating condition data at operation 1112. In some embodiments, the adjusted operating condition data is utilized as corrective responses applied to default optimization data. The default optimization data in some such embodiments corresponds to the default operating condition data. In some embodiments, the apparatus 200 generates the default optimization data based at least in part on the default operating condition data, for example based at least in part on a default assumption associated with the processing unit (e.g., a default assumption associated with a dynamic control scheme, such as an MPC architecture, utilized to control the processing unit).

In some embodiments, the apparatus 200 optionally outputs the adjusted optimization data. For example, in some embodiments, the apparatus 200 outputs the adjusted optimization data by causing rendering of the adjusted optimization data to at least one display associated with the apparatus 200 or a connected client device. Additionally or alternatively, in some embodiments, the apparatus 200 outputs the adjusted optimization data to a subsequent process for further processing. Additionally or alternatively still, in some embodiments, the apparatus 200 outputs the adjusted optimization data to at least one data repository for storing the adjusted optimization data via the at least one data repository.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for improved multi-modal optimization associated with a dynamic control scheme comprising:

generating, by a processor, default operating condition data associated with a first timestamp interval, wherein the default operating condition data represents a first value associated with a first operational mode of a processing unit of a processing plant;

identifying, by the processor, first operating condition data associated at a second timestamp interval comprising at least one subinterval of the first timestamp interval, wherein the first operating condition data represents the first value associated with the first operational mode of the processing unit;

generating, by the processor, intermediary operating condition data by at least subtracting the first operating condition data from the default operating condition data;

identifying, by the processor, second operating condition data associated with a third timestamp interval, comprising at least one subinterval of the second timestamp interval, wherein the second operating condition data represents a second value associated with a second operational mode of the processing unit;

generating, by the processor, adjusted operating condition data representing a mode schedule by at least adding the second operating condition data to the intermediary operating condition data;

generating, by the processor, adjusted optimization data based at least in part on the adjusted operating condition data as a corrective offset to default optimization data that is generated based at least in part on the default operating condition data; and controlling the processing unit in accordance with the mode schedule using the adjusted optimization data.

2. The computer-implemented method of claim 1, further comprising:

generating a step response model matrix corresponding to the first operational mode, wherein the first operating condition data is generated based at least in part on the step response model matrix.

3. The computer-implemented method of claim 2, wherein identifying the first operating condition data comprises:

determining, based at least in part on a pulse input model, a pulse input value associated with at least a first timestamp in the subinterval of the first timestamp interval; and identifying at least a portion of the first operating condition data corresponding to the first timestamp interval based at least in part on the pulse input value and the step response model matrix.

4. The computer-implemented method of claim 1, wherein identifying the first operating condition data comprises:

detecting a first input pulse associated with the first value within the second timestamp interval; and detecting a second input pulse associated with the first value within the second timestamp interval, wherein the first operating condition data comprises a portion of data defined between the first input pulse and the second input pulse.

5. The computer-implemented method of claim 1, wherein the first operating condition data comprises a first feed rate associated with the first operational mode.

6. The computer-implemented method of claim 1, further comprising:

determining the subinterval of the first timestamp interval by at least determining at least one timestamp interval where the processing unit is scheduled to not operate in the first operational mode.

7. The computer-implemented method of claim 1, further comprising:

determining the first subinterval of the second timestamp interval by at least determining at least one timestamp interval where the processing unit is scheduled to operate in the second operational mode.

8. The computer-implemented method of claim 1, further comprising:

identifying at least one additional operating condition data associated with at least one additional timestamp interval, wherein the additional timestamp interval comprises at least one additional subinterval of the second timestamp interval, wherein each additional operating condition data represents an additional value associated with at least one additional operational mode of the processing unit, wherein generating the adjusted operating condition data comprises at least adding the second operating condition data and each additional operating condition data of the at least one additional operating condition data to the intermediary operating condition data.

9. The computer-implemented method of claim 1, wherein the default operating condition data is determined based on an ongoing operational assumption associated with at least the processing unit of the processing plant.

10. An apparatus comprising:

at least one processor; and at least one memory storing instructions that, when executed by the at least one processor, cause the apparatus to:

generate default operating condition data associated with a first timestamp interval, wherein the default operating condition data represents a first value associated with a first operational mode of a processing unit of a processing plant;

identify first operating condition data associated with a second timestamp interval, wherein the second timestamp interval comprises a subinterval of the first timestamp interval, wherein the first operating condition data represents the first value associated with the first operational mode of the processing unit;

generate intermediary operating condition data by at least subtracting the first operating condition data from the default operating condition data;

identify second operating condition data associated with a third timestamp interval, wherein the third timestamp interval comprises at least a first subinterval of the second timestamp interval, wherein the second operating condition data represents a second value associated with a second operational mode of the processing unit;

generate adjusted operating condition data representing a mode schedule by at least adding the second operating condition data to the intermediary operating condition data;

generate adjusted optimization data based at least in part on the adjusted operating condition data as a corrective offset to default optimization data that is generated based at least in part on the default operating condition data; and control the processing unit in accordance with the mode schedule using the adjusted optimization data.

11. The apparatus of claim 10, wherein the instructions further configure the apparatus to:

generate a step response model matrix representing at least the processing unit, wherein the first operating condition data is generated based at least in part on the step response model matrix.

12. The apparatus of claim 11, wherein identifying the first operating condition data comprises:

determine, based at least in part on a pulse input model, a pulse input value associated with at least a first timestamp in the subinterval of the first timestamp interval; and identify at least a portion of the first operating condition data corresponding to the first timestamp interval based at least in part on the pulse input value and the step response model matrix.

13. The apparatus of claim 10, wherein identifying operate first operating condition data comprises:

detect a first input pulse associated with the first value within the second timestamp interval; and detect a second input pulse associated with the first value within the second timestamp interval, wherein the first operating condition data comprises a portion of data defined between the first input pulse and the second input pulse.

14. The apparatus of claim 10, wherein the first operating condition data comprises a first feed rate associated with the first operational mode.

15. The apparatus of claim 10, wherein the instructions further cause the apparatus to:

determine the subinterval of the first timestamp interval by at least determining at least one timestamp interval where the processing unit is scheduled to not operate in the first operational mode.

16. The apparatus of claim 10, wherein the instructions further cause the apparatus to:

determine the first subinterval of the second timestamp interval by at least determining at least one timestamp interval where the processing unit is scheduled to operate in the second operational mode.

17. The apparatus of claim 10, wherein the default operating condition data is determined based on an ongoing operational assumption associated with at least the processing unit of the processing plant.

18. A computer program product comprising at least one non-transitory computer-readable storage medium, the at least one non-transitory computer-readable storage medium including instructions that when executed by at least one processor, cause the at least one processor to:

generate default operating condition data associated with a first timestamp interval, wherein the default operating condition data represents a first value associated with a first operational mode of a processing unit of a processing plant;

identify first operating condition data associated with a second timestamp interval, wherein the second timestamp interval comprises a subinterval of the first timestamp interval, wherein the first operating condition data represents the first value associated with the first operational mode of the processing unit;

generate intermediary operating condition data by at least subtracting the first operating condition data from the default operating condition data;

identify second operating condition data associated with a third timestamp interval, wherein the third timestamp interval comprises at least a first subinterval of the second timestamp interval, wherein the second operating condition data represents a second value associated with a second operational mode of the processing unit;

generate adjusted operating condition data representing a mode schedule by at least adding the second operating condition data to the intermediary operating condition data;

generate adjusted optimization data based at least in part on the adjusted operating condition data as a corrective offset to default optimization data that is generated based at least in part on the default operating condition data; and control the processing unit in accordance with the mode schedule using the adjusted optimization data.

\* \* \* \* \*